United States Patent
Tsuchiya

(10) Patent No.: US 7,593,508 B2
(45) Date of Patent: Sep. 22, 2009

(54) IMAGE SENSING APPARATUS AND IMAGE SENSING METHOD, X-RAY PHOTOGRAPHING SYSTEM AND ITS CONTROL METHOD

(75) Inventor: Keiji Tsuchiya, Tochigi (JP)

(73) Assignee: Canon Kabushiki Kaisha, Tokyo (JP)

(*) Notice: Subject to any disclaimer, the term of this patent is extended or adjusted under 35 U.S.C. 154(b) by 910 days.

(21) Appl. No.: 10/973,708

(22) Filed: Oct. 26, 2004

(65) Prior Publication Data

US 2005/0088566 A1 Apr. 28, 2005

Related U.S. Application Data

(62) Division of application No. 10/139,677, filed on May 2, 2002, now abandoned.

(30) Foreign Application Priority Data

| May 8, 2001 | (JP) | ............................... 2001-137718 |
| Jul. 19, 2001 | (JP) | ............................... 2001-220144 |

(51) Int. Cl.
*H05G 1/56* (2006.01)
(52) U.S. Cl. ..................................... 378/114; 378/98.8
(58) Field of Classification Search ................. 378/98.8, 378/114; 250/370.09
See application file for complete search history.

(56) References Cited

U.S. PATENT DOCUMENTS

| 6,084,939 | A | * | 7/2000 | Tamura | ..................... 378/98.8 |
| 6,510,202 | B2 | | 1/2003 | Tamura et al. | |
| 2002/0001366 | A1 | | 1/2002 | Tamura et al. | |

* cited by examiner

*Primary Examiner*—Chih-Cheng G Kao
(74) *Attorney, Agent, or Firm*—Cowan, Liebowitz & Latman, P.C.

(57) ABSTRACT

A radiography system comprising a detector for detecting radiation generated by a radiation generation device, and a detector controller for initializing the detector at a predetermined timing, and controlling the detector, and taking a radiation image on the basis of the radiation detected by the detector wherein the detector controller comprises storage for acquiring and storing a time period from when initialization of the detector starts until a radiation irradiation request signal is received and instructions for, when the radiation irradiation request signal is received during an initialization process of the detector, instructing to execute a wait process for the stored time period after the initialization process, and upon completion of the wait process, a radiography permission signal is sent to the radiation generation device.

3 Claims, 28 Drawing Sheets

F I G. 22
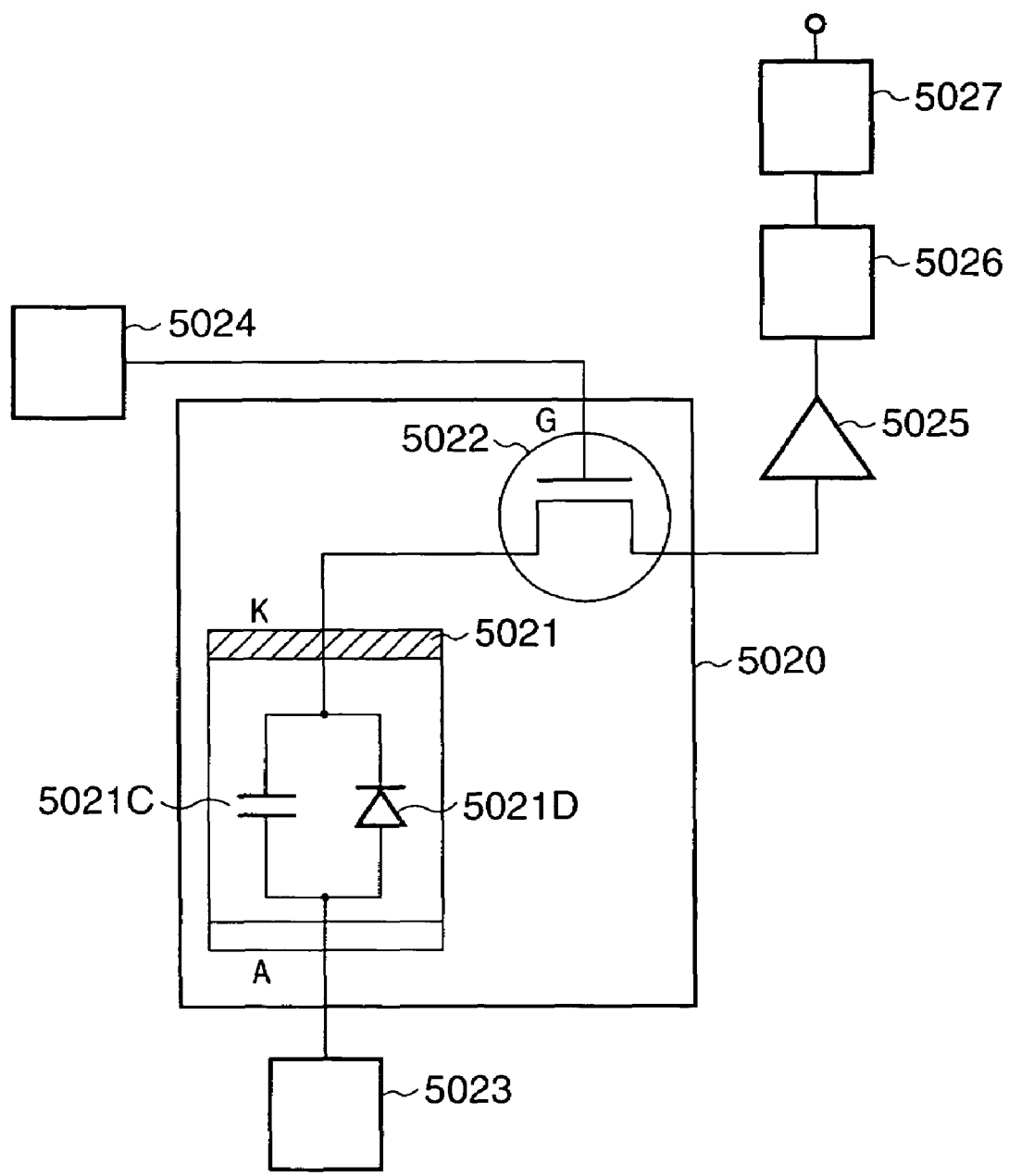

IMAGE SENSING APPARATUS AND IMAGE SENSING METHOD, X-RAY PHOTOGRAPHING SYSTEM AND ITS CONTROL METHOD

This is a divisional of prior application Ser. No. 10/139,677, filed May 2, 2002 now abandoned.

FIELD OF THE INVENTION

The present invention relates to an image sensing apparatus and image sensing method for sensing an object image and, more particularly, to an X-ray image sensing apparatus for sensing an object image by irradiating an object with X-rays.

BACKGROUND OF THE INVENTION

In a conventional X-ray image sensing apparatus, an X-ray beam is projected from an X-ray source via an object to be analyzed such as a patient under medical treatment. Normally, after the beam is transmitted through the object to be analyzed, an image intensifier converts X-ray radiation into a visible image, and a video camera generates an analog video signal from the visible image and displays it on a monitor. Since the analog video signal is generated, an image process for automatic luminance adjustment and image emphasis is done in the analog domain.

A high-resolution solid-state X-ray detector has already been proposed, and comprises a two-dimensional array using 3000 to 4000 detection elements represented by photodiodes or the like. Each element generates an electrical signal corresponding to the pixel luminance of an X-ray image projected onto the detector. Signals from the respective detection elements are individually read and converted into digital signals, which then undergo an image process, storage, and display.

Upon obtaining a medical X-ray image using a large-screen X-ray detector, the X-ray detector requires a certain time until actual X-ray exposure, and is driven in a preparation state to shorten that time.

In the preparation state of the detector, in order to avoid the elements in the detector from being held in a saturation state due to gradually accumulated dark currents, a dedicated read drive process is repeated at given intervals. This repetitive drive process will be referred to as "idling drive" hereinafter. Since the duration of this idling drive period is not defined in practical use, if the idling drive period is long, it shortens the service life of the apparatus, and promotes aging of various characteristics associated with detection.

The present invention has been made in consideration of the above problems, and has as its object to provide an image sensing apparatus and image sensing method, which can implement highly reliable image sensing by suppressing shortening of the service life of the apparatus and aging of various characteristics associated with detection even when the idling drive period, which is difficult to be defined in practical use, is long.

In medical radiography as that for the purpose of medical diagnosis, (spot) photographing uses X-ray photography as a combination of an intensifying screen and X-ray photo film.

When radiation such as X-rays or the like that have been transmitted through an object to be examined become incident on the intensifying screen, a phosphor contained in the intensifying screen absorbs this X-ray energy and emits fluorescence. This fluorescence exposes the X-ray photo film to form a radiation image on it. By developing and fixing the film, an X-ray image can-be visualized.

Recently, various schemes for digitally capturing a radiation image have been developed. In one scheme, using an X-ray image detector which comprises a photoelectric conversion element which has sensitivity to X-rays, converts detected X-rays into electrical signals corresponding to their intensity levels, and outputs the electrical signals, or a combination of a phosphor which absorbs X-ray energy and emits fluorescence with intensity corresponding to the absorbed energy, and a photoelectric conversion element which has sensitivity to visible light and outputs an electrical signal corresponding to its intensity, an X-ray image is converted into an electrical signal, and the electrical signal is A/D-converted to capture a digital image.

FIG. 21 is a schematic block diagram showing an example of an X-ray photographing system.

Referring to FIG. 21, reference numeral 5001 denotes an X-ray generation device; 5002, a host computer; 5003, a phosphor; 5004, a flat-panel detector as a two-dimensional array of a large number of photoelectric conversion elements each of which comprises a photodetector and switching element; 5005, a flat-panel detector controller for controlling the flat-panel detector 5004; and 5006, an object. The X-ray photographing apparatus comprises the phosphor 5003, flat-panel detector 5004, and flat-panel detector controller 5005.

The X-ray generation device 5001 has an X-ray radiation switch (not shown). When the X-ray radiation switch is pressed, a signal indicating that an X-ray generation request is generated is sent to the host computer 5002. The host computer 5002 informs the flat-panel detector controller 5005 of generation of the X-ray radiation request. Upon receiving the X-ray radiation request, the flat-panel detector controller 5005 initializes the flat-panel detector 5004. Upon completion of initialization of the flat-panel detector 5004, the flat-panel detector controller 5005 sends an X-ray radiation permission signal to the host computer 5002. Upon receiving the X-ray radiation permission signal, the host computer 5002 sends a signal indicating that X-ray radiation is permitted to the X-ray generation device 5001. Then, the X-ray generation device 5001 radiates X-rays. The radiated X-rays are transmitted through the object 5006 and are converted by the phosphor 5003 into light proportional to the incoming X-ray dose. This light is converted into an electrical signal by the flat-panel detector 5004. The flat-panel detector controller 5005 reads this electrical signal, and transfers an X-ray digital image to the host computer 5002 at the same time. The transferred X-ray digital image undergoes an image process by the host computer 5002, and the taken X-ray digital image is displayed on a display device (not shown).

FIG. 22 shows an equivalent circuit of one photoelectric conversion element. In the following description, an amorphous silicon sensor will be exemplified as the photoelectric conversion element. However, the photoelectric conversion element need not be particularly limited and, for example, elements such as other solid-state image sensing elements (charge-coupled element and the like), a photomultiplier, or the like may be used.

Referring to FIG. 22, one photoelectric conversion element 5020 comprises a photodetector 5021 and a switching element 5022 for controlling charge accumulation and read. In general, the element 20 is formed on a glass substrate using amorphous silicon (α-Si).

A capacitor 5021C in the photodiode 5021C can simply be a photodiode having a parasitic capacitance, or be a photodetector which includes a parallel circuit of a photodiode 5021D and additional capacitor 5021C to improve the dynamic range of the photodiode 5021D and detector. When X-rays hit the photodetector 5021, the photodiode 5021D generates a charge corresponding to the X-ray dose, and the generated charge is accumulated on the capacitor 5021C.

An anode A of the diode 5021D is connected to a refresh control circuit 5023. The refresh control circuit 5023 normally outputs a bias voltage Vs, but can temporarily output a refresh voltage Vr to initialize the capacitor 5021C.

A cathode K of the diode 5021D is connected to the controllable switching element 5022 used to read the charge accumulated on the capacitor 5021C. In this example, the switching element 5022 is a thin-film transistor connected between the cathode K of the diode 5021D and a charge read amplifier 5025.

A gate G of the switching element 5022 is connected to a gate control circuit 5024, which outputs a gate signal Vg to read the charge accumulated on the capacitor 5021C. The read charge is amplified by the amplifier 5025, and is A/D-converted by an A/D converter 5027 via a sample/hold circuit 5026, thereby converting the charge accumulated on the capacitor 5021C into digital data.

An initialization process of one photoelectric conversion element 5020 will be described below using FIG. 23.

Referring to FIG. 23, a refresh signal indicates the output signal from the refresh control circuit 5023, a gate signal indicates the output signal from the gate control circuit 5024 and a dark current indicates a current that flows the capacitor 5021C. Normally, the voltage of the refresh signal is equal to the bias voltage Vs, that of the gate signal is 0 V, and nearly no dark current flows.

In this state, the refresh voltage Vr is output at time T1 to initialize the capacitor 5021C. When the refresh signal has reached the refresh voltage Vr, a minus dark current flows, and the charge accumulated on the capacitor 5021C is swept out. A time period (a time period from time T1 to time T2) in which the refresh signal is equal to the refresh voltage Vr is determined in advance so as to sufficiently reduce the charge accumulated on the capacitor 5021C.

At time T2, the voltage of the refresh signal is changed to the bias voltage Vs. An operation in which the refresh control circuit 5023 temporarily outputs the refresh signal (=voltage Vr) to initialize the capacitor 5021C will be referred to as "refresh" hereinafter. Immediately after the bias voltage Vs is switched, a large plus dark current is generated, and is accumulated as a charge on the capacitor 5021C. As is known, noise to be superposed on a taken X-ray image is proportional to the square root of the charge accumulated due to the dark current.

After the refresh process, the gate control circuit 5024 temporarily outputs the gate signal Vg at time T3. As a result, the charge accumulated on the capacitor 5021C is swept out.

Time T3 is determined in advance to sufficiently reduce the dark current. In the following description, an operation in which the gate control circuit 5024 temporarily outputs the gate signal Vg to sweep out the charge accumulated on the capacitor 5021C due to the dark current will be referred to as "idle read". When the charge accumulated on the capacitor 5021C is sufficiently swept out, the gate signal is set at 0 V at time T5. A time period (a time period from time T3 to time T5) in which the gate signal is equal to the gate voltage Vg is determined in advance so as to sufficiently reduce the charge accumulated on the capacitor 5021C.

However, even after idle read, since a slight dark current is still flowing, the capacitor 5021C gradually accumulates a charge. For this reason, the initialization process of the photoelectric conversion element 5020, which includes the refresh process and idle read process, is repeated periodically. Also, for the same reason as above, the initialization process of the photoelectric conversion element 5020 is done immediately before X-ray photographing.

FIG. 24 is a block diagram showing an example of the flat-panel detector 5004 and flat-panel detector controller 500-5.

Referring to FIG. 24, reference numeral 5007 denotes a CPU for reading an X-ray digital image from a flat-panel detector 5004, and a refresh control circuit 5008, row address select circuit 5009, and column address select circuit 5010 are connected to the CPU 5007. The CPU 5007 can control these circuits. The CPU 5007 is connected to the host computer 5002 (not shown in FIG. 24), and can transfer an X-ray digital image read from the flat-panel detector 5004 to the host computer 5002.

The flat-panel detector 5004 comprises a two-dimensional array of a large number of photoelectric conversion elements 5020 shown in FIG. 22. However, in FIG. 24, photoelectric conversion elements 5020 are two-dimensionally arranged in a 2×2 (row×column) matrix for the sake of simplicity.

As described above, the photoelectric conversion element 5020 for one pixel comprises the photodiode 5021 and switching TFT 5022. Photodetectors 5021(1,1) to 5021(2,2) correspond to the aforementioned photodetector 5021, and K and A respectively represent the cathode and anode sides of the photodetector 5021. The TFTs 5022(1,1) to 5022(2,2) correspond to the switching TFT 5022, and S, G, and D respectively represent the source, gate, and drain electrodes of the TFT.

The gate electrodes G of the TFTs 5022 of each row are connected to the row address select circuit 5009, which comprises the aforementioned gate control circuit 5024 and switches SWr1 and SWr2.

The drain electrodes D of the TFTs 5022 of each column are connected to the column address select circuit 5010, which comprises the amplifier 5025, sample/hold circuit 5026, and switches SWc1 and SWc2.

The anode sides of all the photodetectors 5021 are connected to the refresh control circuit 5008, which normally outputs a bias voltage Vs, and also outputs a refresh voltage Vr as a refresh signal. The refresh control circuit 5008 is the same as the refresh control circuit 5023 shown in FIG. 22.

The initialization process of the plurality of photoelectric conversion elements 5020 shown in FIG. 25 in the arrangement shown in FIG. 24 will be explained below.

Referring to FIG. 25, a refresh signal indicates the output signal from the refresh control circuit 5008, a gate signal indicates the output signal from the gate control circuit 5024, and SWr1 and SWr2 indicate the switches SWr1 and SWr2 in the row address select circuit 5009. Normally, the voltage of the refresh signal is equal to the bias voltage Vs, that of the gate signal is 0 V, and the switches SWr1 and SWr2 are OFF. Therefore, the anode sides A of all the photodetectors 5021(1,1) to 5021(2,2) are set at the bias voltage Vs, and the gate electrodes G of all the TFTs 5022(1,1) to 5022(2,2) are set at 0 V.

In this state, the refresh voltage Vr is output at time T1 to initialize all the photodetectors 5021. When the refresh signal has reached the refresh voltage Vr, a minus dark current flows, and the charge accumulated on the capacitor 5021C of each photodetector 5021 is swept out. At time T2, the voltage of the refresh signal is set at the bias voltage Vs. Immediately after refresh signal is switched to the bias voltage Vs, a large plus dark current is generated, and is accumulated on the capacitor 5021C of each photodetector 5021 as a charge. Hence, after the refresh process, the gate control circuit 5024 temporarily outputs a gate signal Vg at time T3 to turn on the switch SWr1. As a result, the voltages at the gate electrodes G of the TFTs 5022(1,1) and 5022(1,2) of the first row change to Vg, and the charges accumulated on the capacitors 5021C in the photodetectors 5021 of the first row are swept out. At time T4, the switch SWr1 is turned off, and the switch SWr2 is turned on. The voltages at the gate electrodes G of the TFTs 5022(1,1) and 5022(1,2) of the first row change to 0 V, and those at the gate electrodes G of the TFTs 5022(2,1) and 5022(2,2) of the second row change to Vg. Hence, the charges accumulated on the capacitors 5021C in the photodetectors 5021 of the second row are swept out.

When the gate signal is set at 0 V and the switch SWr2 is turned off at time T5, the gate electrodes G of all the TFTs 5022(1,1) to 5022(2,2) change to 0 V, thus ending the initialization process. The initialization process is executed during the period from time T1 to time T5.

FIG. 26 shows the relationship between the initialization process of the photoelectric conversion elements 5020 and X-ray photographing. As shown in FIG. 26, when no X-ray photographing is made, the refresh and idle read processes (initialization process) are periodically repeated at intervals TI. FIG. 26 shows a case wherein the X-ray radiation switch of the X-ray generation device 5001 is pressed at time T1 (a timing other than those of the refresh and idle read processes), and the X-ray radiation request reaches the flat-panel detector controller 5005 via the host computer 5002. Upon generation of the X-ray radiation request, the host computer 5002 that has received this request changes an X-ray radiation request signal to Low.

When the X-ray radiation request signal has changed to Low, the refresh and idle read processes are executed again. Upon completion of these processes, the flat-panel detector controller 5005 outputs an X-ray radiation permission signal at time T5. That is, the controller 5005 changes the X-ray radiation permission signal to Low. When the X-ray radiation permission signal has changed to Low, X-ray radiation is permitted. Note that the time period from when the X-ray radiation request signal has changed to Low until the X-ray radiation permission signal changes to Low is called an exposure delay time period, and is indicated by TD1 in FIG. 26.

When the X-ray radiation permission signal has reached the X-ray generation device 5001 via the host computer 5002, the X-ray generation device 5001 radiates X-rays, as shown in FIG. 26. When the X-ray generation device 5001 radiates X-rays, the radiated X-rays are transmitted through the object 5006, and are converted into light proportional to the incoming X-ray dose by the phosphor 5003, and charges corresponding to the light are accumulated on the capacitors 5021C.

Upon completion of X-ray radiation, the host computer 5002 changes the X-ray radiation permission signal to High at time T6, and outputs it to the X-ray generation device 5001. When the X-ray radiation permission signal has changed to High, the X-ray radiation request signal goes High.

Also, upon completion of X-ray radiation, the gate signal is set at Vg and the switch SWr1 is turned on at time T6. As a result, the voltages at the gate electrodes G of the TFTs 5022(1,1) and 5022(1,2) of the first row shown in FIG. 24 change to Vg, the charges accumulated on the capacitors 5021C in the photodetectors 5021 of the first row are read, and the read signals are held via the amplifier 5025 and sample/hold circuit 5026. When the switch SWc1 is turned on at time T6, the held signal of the photodetector 5021(1,1) is converted into a digital value by the A/D converter 5027, and that value is transferred to the host computer 5002. Also, when the switch SWc1 is turned off and the switch SWc2 is turned on at time T7, the held signal of the photodetector 5021(1,2) is converted into a digital value by the A/D converter 5027, and that value is transferred to the host computer 5002.

When the switch SWr1 is turned off and the switch SWr2 is turned on at time T8, the voltages at the gate electrodes G of the TFTs 5022(1,1) and 5022(1,2) of the second row shown in FIG. 24 change to Vg, the charges accumulated on the capacitors 5021C in the photodetectors 5021 of the second row are read, and the read signals are held via the amplifier 5025 and sample/hold circuit 5026. When the switch SWc1 is turned on at time T8, the held signal of the photodetector 5021(2,1) is converted into a digital value by the A/D converter 5027, and that value is transferred to the host computer 5002. Also, when the switch SWc1 is turned off and the switch SWc2 is turned on at time T9, the held signal of the photodetector 5021(2,2) is converted into a digital value by the A/D converter 5027, and that value is transferred to the host computer 5002.

After all the charges accumulated on the flat-panel detector 5004 are transferred to the host computer 5002, the gate signal is set at 0 V, and the switches SWr1, SWr2, SWc1, and SWc2 are turned off at time T10. In the following description, an operation in which all charges accumulated on the flat-panel detector 5004 are read by setting the gate signal at Vg, and temporarily turning on the switches SWr1, SWr2, SWc1, and SWc2 will be referred to as "main read".

In the aforementioned prior art, as shown in FIG. 26, when the X-ray radiation switch is pressed at a timing other than the initialization process, and the X-ray radiation request signal goes Low, the refresh and idle read processes are immediately executed.

However, when the X-ray radiation switch is pressed during the initialization process, and the X-ray radiation request signal goes Low, the current initialization process is interrupted, and is redone from the beginning. Upon generation of an X-ray radiation request, if the initialization process is interrupted and the refresh process is executed immediately, a dark current flows. As a result, many charges are accumulated on the capacitors 5021C, and some charges remain even after the idle read process. Since it is known that noise to be superposed on a taken X-ray image is proportional to the square root of the charge accumulated due to the dark current, if X-rays are radiated in this state, noise on the taken X-ray image is emphasized.

The present invention has been made in consideration of the aforementioned problems, and has as its object to prevent noise in an taken X-ray image from increasing even when an X-ray radiation request is received during initialization of a detector.

It is preferable to shorten the time period from when the X-ray radiation request is received until X-ray photographing is permitted. Therefore, it is another object of the present invention to shorten the exposure delay time period upon receiving an X-ray radiation request during initialization of the detector.

SUMMARY OF THE INVENTION

In order to achieve the object of the present invention, an image sensing apparatus of the present invention comprising:
an image sensing region for sensing an object image; and
a drive circuit for resetting the image sensing region at a first time interval during a first period before an image sensing operation, and for resetting the image sensing region at a second time interval during a second period prior to the first period,
wherein the first time interval is different from the second time interval.

In order to achieve the object of the present invention, an sensing apparatus of the present invention comprising: an image sensing region for sensing an object image; and a drive circuit for resetting the image sensing region at a predetermined interval during a first time period before an image sensing operation, and for resetting the image sensing region at a predetermined interval during a second time period prior to the first time period, wherein the first time period is different from the second time period.

In order to achieve the object of the present invention, an image sensing method of the present invention comprising: resetting an image sensing region used to sense an object image at a first time interval during a first period before an image sensing operation, and resetting the image sensing region at a second time interval during a second period prior to the first period, wherein the first time interval is different from the second time interval.

In order to achieve the object of the present invention, an image sensing method of the present invention comprising: resetting an image sensing region used to sense an object image at a predetermined interval during a first time period before an image sensing operation, and resetting the image sensing region at a predetermined interval during a second time period prior to the first time period, wherein the first time period is different from the second time period.

In order to achieve the object of the present invention, a radiography system of the present invention comprising: a radiography system which comprises a detector for detecting radiation generated by a radiation generation device, and a detector controller for initializing the detector at a predetermined timing, and controlling the detector, and takes a radiation image on the basis of the radiation detected by the detector, wherein the detector controller comprises:

storage means for acquiring and storing a time period from when initialization of the detector starts until a radiation irradiation request signal is received; and instruction means for, when the radiation irradiation request signal is received during an initialization process of the detector, instructing to execute a wait process for the stored time period after the initialization process, and upon completion of the wait process by the instruction means, a radiography permission signal is sent to the radiation generation device.

In order to achieve the object of the present invention, a radiography system of the present invention comprising: a radiography system which comprises a detector for detecting radiation generated by a radiation generation device, and a detector controller for initializing the detector at a predetermined timing, and controlling the detector, and takes a radiation image on the basis of the radiation detected by the detector, wherein when a radiation irradiation request signal is received during an initialization process of the detector, the detector controller sends a radiography permission signal to the radiation generation device after completion of the initialization process.

In order to achieve the object of the present invention, a method of controlling a radiography system of the present invention comprising: a method of controlling a radiography system which comprises a detector for detecting radiation generated by a radiation generation device, and a detector controller for initializing the detector at a predetermined timing, and controlling the detector, and takes a radiation image on the basis of the radiation detected by the detector, wherein the detector controller acquires and stores a time period from when initialization of the detector starts until a radiation irradiation request signal is received, when the detector controller receives the radiation irradiation request signal during an initialization process of the detector, the detector controller instructs to execute a wait process for the stored time period after the initialization process, and the detector controller sends a radiography permission signal to the radiation generation device upon completion of the wait process based on the instruction.

In order to achieve the object of the present invention, a method of controlling a radiography system of the present invention comprising: a method of controlling a radiography system which comprises a detector for detecting radiation generated by a radiation generation device, and a detector controller for initializing the detector at a predetermined timing, and controlling the detector, and takes a radiation image on the basis of the radiation detected by the detector, wherein when a radiation irradiation request signal is received during an initialization process of the detector, the detector controller sends a radiography permission signal to the radiation generation device after completion of the initialization process.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 22 is an equivalent circuit diagram of one photoelectric conversion element;

DETAILED DESCRIPTION OF THE PREFERRED EMBODIMENTS

Preferred embodiments of the present invention will now be described in detail in accordance with the accompanying drawings.

First Embodiment

Figure 1:
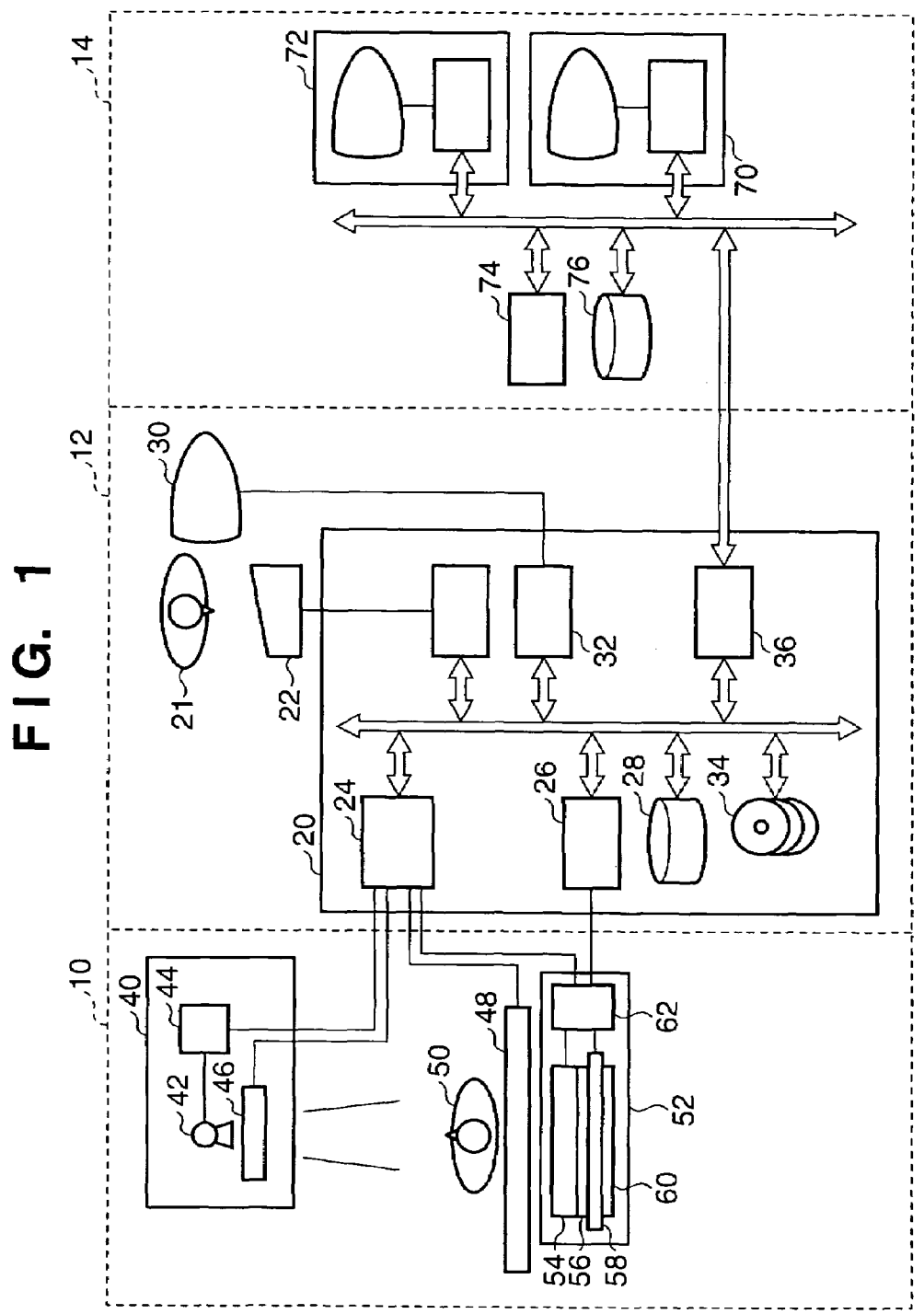
FIG. 1 is a block diagram showing the arrangement of an X-ray image sensing system according to an embodiment of the present invention.

FIG. 1 is a block diagram showing the arrangement of an X-ray image sensing system according to an embodiment of the present invention. Referring to FIG. 1, reference numeral 10 denotes an X-ray room; 12, an X-ray control room; and 14, a diagnosis room. In the X-ray control room 12, a system controller 20 that controls the overall operations of the X-ray image sensing system of this embodiment is arranged. An operator interface 22, which includes an X-ray exposure request switch (SW), touch panel, mouse, keyboard, joystick, foot switch, and the like, is operated by an operator 21 to input various commands to the system controller 20. The instruction contents of the operator 21 include, for example, photographing conditions (still image/moving image, X-ray tube voltage, tube current, X-ray irradiation time, and the like), a photographing timing, image processing conditions, a patient ID, a processing method of a captured image, and the like. An image sensing controller 24 controls an X-ray image sensing system set in the X-ray room 10, and an image processor 26 executes image processes of an image sensed by the X-ray sensing system in the X-ray room 10. The image processes by the image processor 26 include, for example, correction, spatial filtering, a recursive process, tone process, a scattered ray correction & dynamic range (DR) compression process, and the like of image data.

Reference numeral 28 denotes a large-size, high-speed storage device for storing basic image data processed by the image processor 26. The storage device 28 comprises, for example, a RAID hard disk array. Reference numeral 30 denotes a monitor display (to be simply referred to as a monitor hereinafter) for displaying a video; 32, a display controller for controlling the monitor 30 to display various characters and images; 34, a large-size external storage device (e.g., a magnetooptical disk); and 36, a LAN board which connects devices in the X-ray control room 12 and those in the diagnosis room 14 to transfer, e.g., an image taken in the X-ray room 10 to the devices in the diagnosis room 14.

In the X-ray room 10, an X-ray generator 40 for generating X-rays is set. The X-ray generator 40 comprises an X-ray tube 42 for generating X-rays, a high-voltage generation source 44 for driving the X-ray tube 42 under the control of the image sensing controller 24, and an X-ray stop 46 for stopping down an X-ray beam generated by the X-ray tube 42 to a desired image sensing region, and a patient 50 as an object to be examined lies on a photographing bed 48. The photographing bed 48 is driven in accordance with a control signal from the image sensing controller 24, and can change the direction of the patient with respect to the X-ray beam coming from the X-ray generator 40. Under the photographing bed 48, an X-ray detector 52 for detecting the X-ray beam that has been transmitted through the patient 50 and photographing bed 48 is arranged.

The X-ray detector 52 comprises a multilayered structure of a grid 54, scintillator 56, photodetector array 58, and X-ray exposure amount monitor 60, and a driver 62 for driving the photodetector array 58. The grid 54 is used to reduce the influence of scattered X-rays generated when X-rays are transmitted through the patient 50. The grid 54 is made up of X-ray low- and high-absorption members, and comprises a stripe structure of Al and Pb. The X-ray detector 52 drives the grid 54 in accordance with a control signal from the driver 62 upon X-ray radiation, so as to prevent moiré from being generated by the grating ratio between the photodetector array 58 and grid 54.

In the scintillator 56, the matrix material of a phosphor is excited (to absorb X-rays) by X-rays with high energy, and fluorescence in the visible range is generated by recombination energy generated at that time. That is, the scintillator 56 converts X-rays into visible light. The fluorescence may be generated by the matrix substance itself such as $CaWo_4$, $CdWo_4$, or the like, or a luminescence center material such as CsI:Ti, ZnS:Ag, or the like added in the matrix substance. The photodetector array 58 converts visible light generated by the scintillator 56 into an electrical signal.

In this embodiment, the scintillator 56 and photodetector array 58 are independently arranged. Of course, the present invention can be applied to a detector that directly converts X-rays into electrons. For example, a radiation (X-ray) detector, which comprises a light-receiving unit of amorphous Se, $PbI_2$, or the like, an amorphous silicon TFT, and the like, may be used.

The X-ray exposure amount monitor 60 is arranged for the purpose of monitoring the X-ray transmission amount. As the X-ray exposure amount monitor 60, X-rays may be directly detected using a light-receiving element of crystalline silicon or the like, or fluorescence generated by the scintillator 56 may be detected. In this embodiment, the X-ray exposure amount monitor 60 comprises an amorphous silicon receiving element formed on the rear surface of a substrate of the photodetector array 58. The X-ray exposure amount monitor 60 detects light (proportional to the X-ray dose) transmitted through the photodetector array 58, and sends that light amount information to the image sensing controller 24. The image sensing controller 24 controls the high-voltage generation source 40 on the basis of the information received from the X-ray exposure amount monitor 60, thereby controlling the X-ray dose.

The driver 62 drives the photodetector array 58 under the control of the image sensing controller 24, and reads signals from respective pixels. The operations of the photodetector array 58 and driver 62 will be described in detail later.

In the diagnosis room 14, an image processing terminal 70 which is used to execute image processes of an image transferred via the LAN board 36 and to help diagnosis, a video display monitor 72 and image printer 74 for outputting an image (moving image/still image) transferred via the LAN board 36, and a file server 76 for storing image data are equipped.

Note that control signals from the system controller 20 to respective devices can be generated in response to instructions from the operator interface 22 in the X-ray control room 12 or from the image processing terminal 70 in the diagnosis room 14.

The basic operation of the system controller 20 will be described below.

The system controller 20 sends a photographing condition command to the image sensing controller 24 that controls the sequence of the X-ray image sensing system on the basis of an instruction from the operator 21, and the image sensing controller 24 drives the X-ray generator 40, photographing bed 48, and X-ray detector 52 on the basis of the command, thus taking an X-ray image. An X-ray image signal output from the X-ray detector 52 is supplied to the image processor 26, and undergoes image processes designated by the operator 21. The processed image is displayed on the monitor 30, and is simultaneously stored in the storage device 28 as basic image data. Furthermore, the system controller 20 executes re-image processes and displays an image as a result of the processes, and transfers image data to a device on the network to save, display, and execute a film print process of the image data, on the basis of an instruction from the operator 21.

The basic operation of the system shown in FIG. 1 will be described below along the flow of signals.

The high-voltage generation source 44 of the X-ray generator 40 applies a high voltage for X-ray generation to the X-ray tube 42. In response to this voltage, the X-ray tube 42 generates an X-ray beam. The patient 50 as an object to be examined is irradiated with the generated X-ray beam via the X-ray stop 46. The X-ray stop 46 is controlled by the image sensing controller 24 in correspondence with the position to be irradiated with the X-ray beams. That is, the X-ray stop 46 shapes the X-ray beam to avoid unnecessary X-ray radiation in correspondence with a change in image sensing region.

The X-ray beam output from the X-ray generator 40 is transmitted through the patient 50 who lies on the X-ray transmission photographing bed 48, and the photographing bed 48, and enters the X-ray detector 52. Note that the photographing bed 48 is controlled by the image sensing controller 24 so that an X-ray beam is transmitted through different portions of the object to be examined or through the object in different directions.

The grid 54 of the X-ray detector 52 reduces the influence of scattered X-rays generated when the X-ray beam is transmitted through the patient 50. The image sensing controller 24 vibrates the grid 54 upon X-ray radiation so as not to generate moiré due to the grating ratio between the photodetector array 58 and grid 54. In the scintillator 56, the matrix material of the phosphor is excited (to absorb X-rays) by X-rays with high energy, and fluorescence in the visible range is generated by recombination energy generated at that time. The photodetector array 58 arranged in the neighborhood of the scintillator 58 converts the fluorescence generated by the scintillator 56 into an electrical signal.

In other words, the scintillator 56 converts an X-ray image into a visible light image, and the photodetector array 58 converts the visible light image into an electrical signal. The X-ray exposure amount monitor 60 detects visible light (proportional to the X-ray dose) transmitted through the photodetector array 58, and supplies the detected amount information to the image sensing controller 24. The image sensing controller 24 controls the high-voltage generation source 44 based on the X-ray exposure amount information to intercept or adjust X-rays. The driver 62 drives the photodetector array 58 under the control of the image sensing controller 24 to read pixel signals from respective photodetectors. Details of the photodetector array 58 and driver 62 will be described later.

Pixel signals output from the X-ray detector 52 are supplied to the image processor 26 in the X-ray control room 12. Since large noise is generated inside the X-ray room upon generation of X-rays, a signal transmission path from the X-ray detector 52 to the image processor 26 must have high noise resistance. More specifically, a digital transmission system having an advanced error correction function, or a twisted pair cable or optical fiber with a shield by means of a differential driver is preferably used.

As will be described in detail later, the image processor 26 switches the display format of an image signal on the basis of a command from the system controller 20. In addition, the image processor 26 makes correction, spatial filtering, recursive process, and the like of an image signal in real time, and can execute a tone process, scattered ray correction & DR compression process, and the like. The image processed by the image processor 26 is displayed on the screen of the monitor 30.

Simultaneously with the real-time image processes, image information (basic image) that has undergone only image correction is saved in the storage device 28. Also, based on an instruction from the operator 21, the image information stored in the storage device 28 is reconstructed to satisfy a predetermined format (e.g., Image Save & Carry (IS&C)), and is then stored in the external storage device 34 and a hard disk or the like in the file server 76.

The devices in the X-ray control room 12 are connected to a LAN (or WAN) via the LAN board 36.

A plurality of X-ray image sensing systems can be connected to the LAN. The LAN board 36 outputs image data in accordance with a predetermined protocol (for example, Digital Imaging and Communications in Medicine (DICOM)). When an X-ray image is displayed on the screen of the monitor 72 connected to the LAN (or WAN) as a high-resolution still image/moving image, a doctor can make remote diagnosis in real time at substantially the same timing as X-ray photographing.

Figure 2:
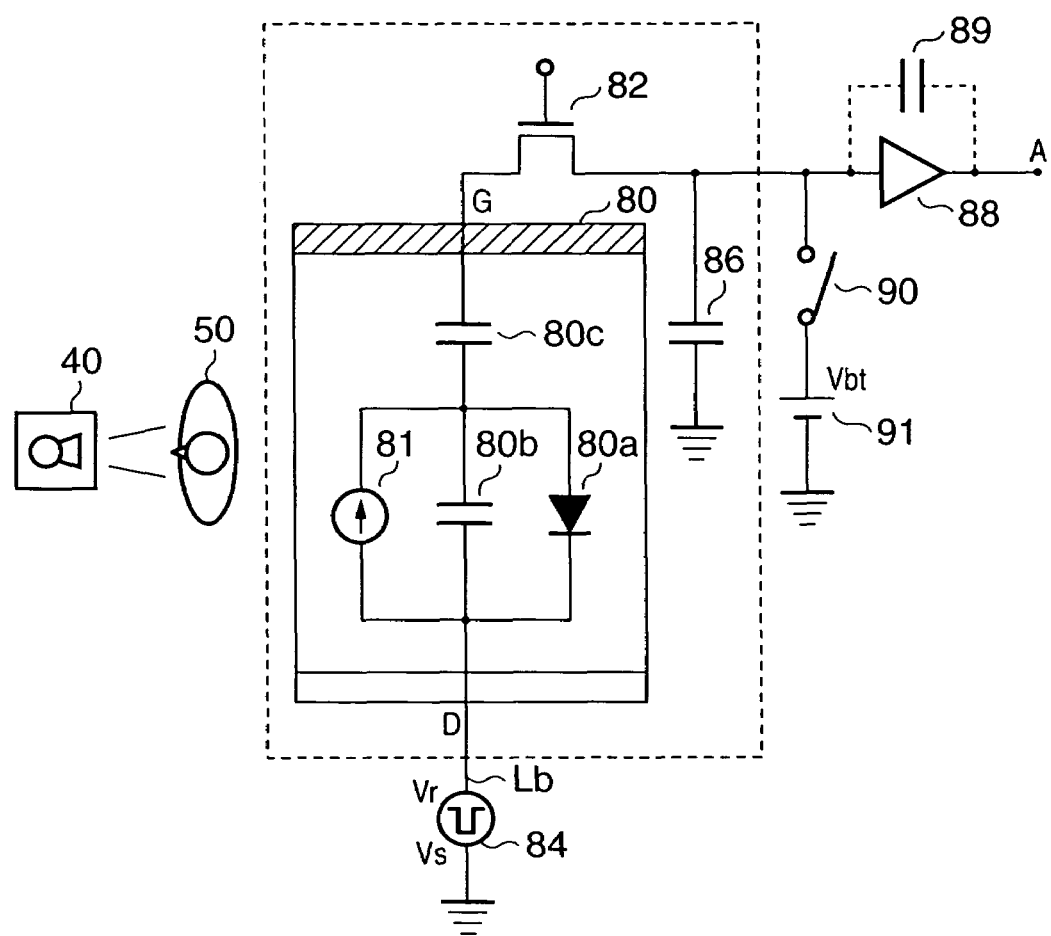
FIG. 2 is an equivalent circuit diagram of a building unit of a photodetector array.

FIG. 2 is an equivalent circuit diagram of a building unit of the photodetector array 58.

One element comprises a photodetector 80 and a switching thin-film transistor (TFT) 82 that controls charge accumulation and read. In general, the element formed on a glass substrate using amorphous silicon (α-Si). The photodetector 80 comprises a parallel circuit of a photodiode 80a and capacitor 80b, and a capacitor 80c connected in series with the capacitor 80b. Also, the charge obtained as a result of a photoelectric effect is expressed as a constant current source 81. The capacitor 80b can be the parasitic capacitance of the photodiode 80a or an additional capacitor used to improve the dynamic range of the photodiode 80a. A common bias electrode (to be referred to as a D electrode hereinafter) of the photodetector 80 is connected to a bias power supply 84 via a bias line Lb. An electrode on the switching TFT 82 side (to be referred to as a G electrode hereinafter) of the photodetector 80 is connected to a capacitor 86 and charge read pre-amplifier 88 via a switching TFT 82. The input of the pre-amplifier 88 is connected to the ground via a reset switch 90 and signal line bias power supply 91.

The device operation of the photodetector 80 will be explained below using FIG. 3.

Figure 3A:
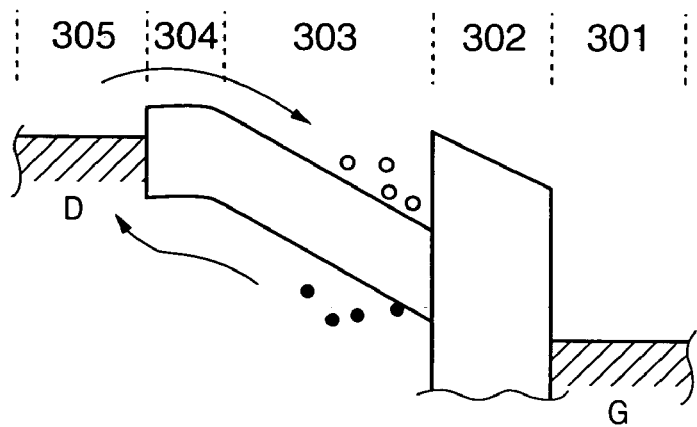
FIG. 3A is a diagram for explaining the device operation of the photodetector.
Figure 3B:
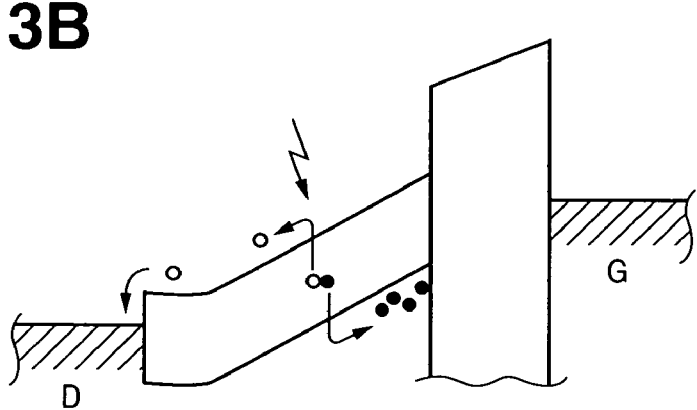
FIG. 3B is a diagram for explaining the device operation of the photodetector.
Figure 3C:
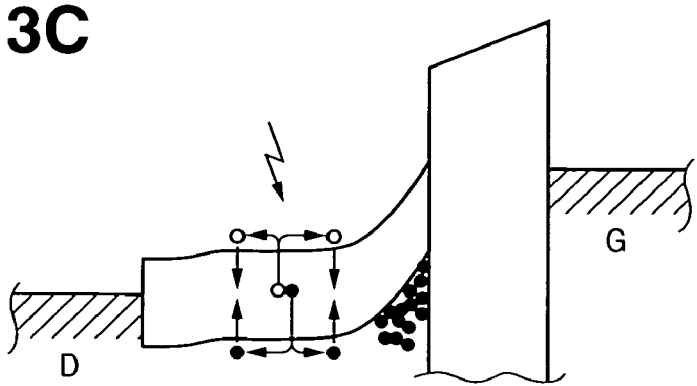
FIG. 3C is a diagram for explaining the device operation of the photodetector.

FIGS. 3A and 3B are energy band diagrams respectively showing the refresh and photoelectric conversion mode operations of a photoelectric conversion element of this embodiment, and illustrate the states in the direction of thickness of respective layers.

Reference numeral 301 denotes a lower electrode (G electrode) formed of Cr. Reference numeral 302 denotes an SiN insulating layer that blocks passage of both electrons and holes. The thickness of the insulating layer 302 is set to be 50 nm or more, which does not allow electron/hole movement by a tunnel effect. Reference numeral 303 denotes a photoelectric conversion semiconductor layer formed of an intrinsic semiconductor i-layer of amorphous silicon (a-Si) hydride; 304, an injection blocking layer of an a-Si n-layer, which blocks injection of holes into the photoelectric conversion semiconductor layer 303; and 305, an upper electrode (D electrode) made up of Al. In this embodiment, although the D electrode does not completely cover the n-layer, since electrons can move freely between the D electrode and n-layer, the D electrode and n-layer always have equal potentials, and the following explanation will be given under the condition of that fact. The photoelectric conversion element has two different operations, i.e., a refresh mode and photoelectric conversion mode, depending on the way a voltage is applied to the G electrode.

In FIG. 3A, a negative potential with respect to the G electrode is applied to the D electrode, and holes indicated by full circles in the i-layer 303 are guided to the D electrode by the electric field. At the same time, electrons indicates by open circles are injected into the i-layer 303. At the same time, some holes and electrons recombine and disappear in the n-layer 304 and i-layer 303. If this state continues for a sufficiently long period of time, holes in the i-layer 303 are swept out from the i-layer 303.

In order to set the photoelectric conversion mode (FIG. 3B) from the aforementioned state, a positive potential with respect to the G electrode is applied to the D electrode. Then, electrons in the i-layer 303 are instantaneously guided to the D electrode. However, since the n-layer serves as an injection blocking layer, holes are never guided to the i-layer 303. When light becomes incident on the i-layer 303 in this state, the light is absorbed to generate an electron-hole pair. This electron is guided to the D electrode by the electric field, and the hole moves in the i-layer 303 and reaches the interface between the i-layer 303 and insulating layer 302. However, since the hole cannot move into the insulating layer 302, it moves to the interface with the insulating layer 302 in the i-layer 303, and a current for maintaining electroneutrality in the element flows from the G electrode. Since this current corresponds to the electron hole pair generated by the light, it is proportional to the incoming light.

After the state of the photoelectric conversion mode shown (FIG. 3B) is maintained for a given period of time, if the state of the refresh mode (FIG. 3A) is set, holes which stay in the i-layer 303 are guided to the D electrode, as described above, and a current corresponding to these holes flows at the same time. The quantity of holes corresponds to the total amount of incoming light during the photoelectric conversion mode period. At this time, a current corresponding to the quantity of electrons injected into the i-layer 303 also flows. However, since this quantity is nearly constant, it can be subtracted upon detection. That is, the photoelectric conversion element in this embodiment can output the amount of incoming light in real time, and can also output the total amount of incoming light during a given period.

However, when the photoelectric conversion mode period is prolonged for some reason, or when incoming light has high illuminance, a current does not often flow although light enters. Such phenomenon occurs since a large number of holes stay in the i-layer 303 and a newly generated electron is recombined with a hole in the i-layer 303 due to the presence of those holes. If the incoming light state changes in this state, a current often flows unstably. However, if the refresh mode is set again, holes in the i-layer 303 are swept out, and a current proportional to light flows again in the next photoelectric conversion mode.

In the above description, when holes in the i-layer 303 are swept out in the refresh mode, it is ideal to sweep out all holes, but it is still effective to sweep out only some holes. In this case, a current equal to that described above can be obtained, and no problem is posed. That is, it is required to only prevent the state shown in FIG. 3C at the detection opportunity of the next photoelectric conversion mode, and the potential of the D electrode with respect to the G electrode in the refresh mode, the period of the refresh mode, and the characteristics of the injection blocking layer of the n-layer 304 need only be determined to meet such requirement.

Furthermore, injection of electrons into the i-layer 303 in the refresh mode is not a necessary condition, and the potential of the D electrode with respect to the G electrode is not limited to negative. When a large number of holes stay in the i-layer 303, even when the potential of the D electrode with respect to the G electrode is positive, the electric field in the i-layer 303 acts in a direction to guide the holes toward the D electrode. Likewise, in the characteristics of the injection blocking layer of the n-layer 304, whether or not electrons can be injected into the i-layer 303 is not a necessary condition.

Referring back to FIG. 2, read of a signal from one pixel will be explained.

The switching TFT 82 and reset switch 90 are temporarily turned on to set the bias power supply 84 at a potential in the refresh mode. After the capacitors 80b and 80c are reset, the bias power supply 84 is set at a potential in the photoelectric conversion mode, and the switching TFT 82 and reset switch 90 are sequentially turned off. After that, X-rays are generated to irradiate the patient 50 with them. The scintillator 54 converts an X-ray image that has been transmitted through the patient 50 into a visible light image, and the photodiode 80a is enabled by that visible light image to discharge the charge on the capacitor 80b. The switching TFT 82 is turned on to connect the capacitors 80b and 86. In this manner, the information in the capacitor 80c is also supplied to the capacitor 86. A voltage corresponding to the charge accumulated on the capacitor 86 is amplified by the pre-amplifier 88, or that charge is charge-voltage converted by a capacitor 89 indicated by the dotted line, and the voltage is externally output.

Figure 4:
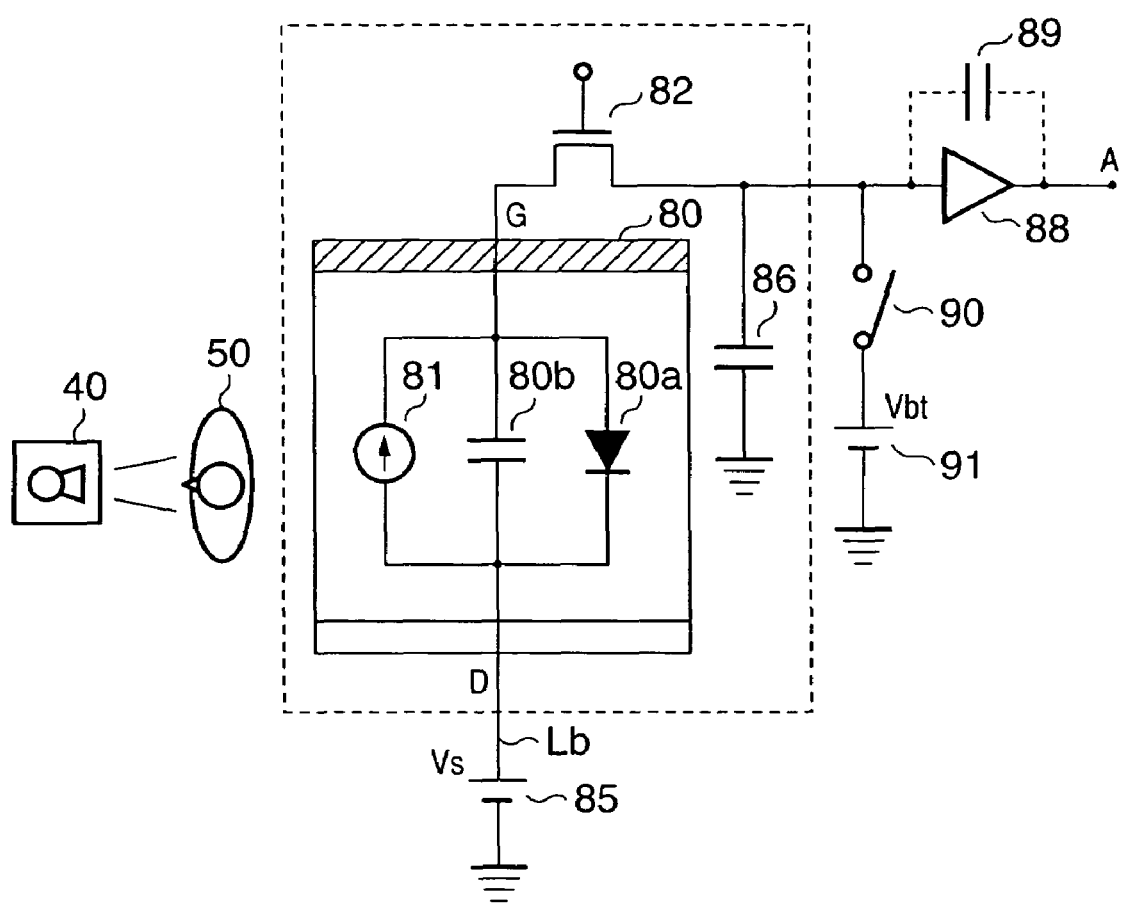
FIG. 4 is an equivalent circuit diagram of a building unit of a photodetector array.

FIG. 4 is an equivalent circuit diagram of a building unit of the photodetector array 58.

One element comprises a photodetector 80 and a switching thin-film transistor (TFT) 82 that controls charge accumulation and read. In general, the element is formed on a glass substrate using amorphous silicon (α-Si). The photodetector 80 comprises a parallel circuit of a photodiode 80a and capacitor 80b, and a charge obtained as a result of a photoelectric effect is expressed as a constant current source 81. The capacitor 80b can be a parasitic capacitance of the photodiode 80a or an additional capacitor used to improve the dynamic range of the photodiode 80a. The cathode of the photodetector 80 (photodiode 80a) is connected to a bias power supply 85 via a bias line Lb which serves as a common electrode (D electrode). The anode of the photodetector 80 (photodiode 80a) is connected from the gate electrode (G electrode) to a capacitor 86 and charge preamplifier 88 via the switching TFT 82. The input of the pre-amplifier 88 is connected to the ground via a reset switch 90 and signal line bias power supply 91.

The switching TFT 82 and reset switch 90 are temporarily turned on to reset the capacitor 80b, and are then turned off. After that, X-rays are generated to irradiate the patient 50 with them. The scintillator 54 converts an X-ray image that has been transmitted through the patient 50 into a visible light image, and the photodiode 80a is enabled by that visible light image to discharge the charge on the capacitor 80b. The switching TFT 82 is turned on to connect the capacitors 80b and 86. In this manner, information in the capacitor 80c is also supplied to the capacitor 86. A voltage corresponding to the charge accumulated on the capacitor 86 is amplified by the pre-amplifier 88, or the charge is charge-voltage converted by a capacitor 89 indicated by the dotted line, and the voltage is externally output.

The photoelectric conversion operation using a two-dimensional matrix of the photoelectric conversion elements shown in FIG. 2 or 4 will be explained below.

Figure 5:
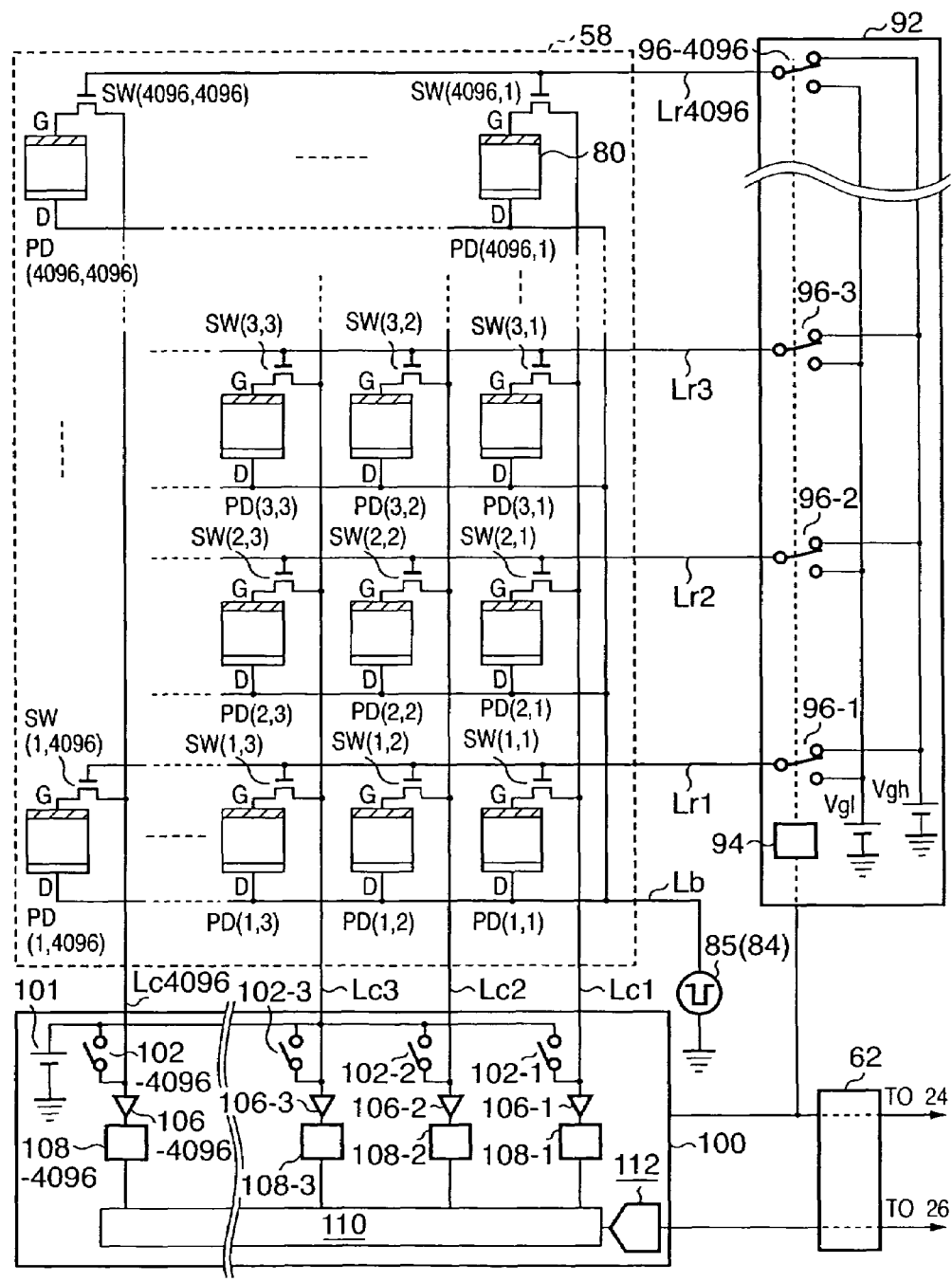
FIG. 5 is an equivalent circuit diagram of a photodetector array which comprises a two-dimensional matrix of photoelectric conversion elements.

FIG. 5 is an equivalent circuit diagram of the photodetector array 58 which comprises a two-dimensional matrix of photoelectric conversion elements.

Since the aforementioned two different equivalent circuits undergo the same two-dimensional read operation, FIG. 5 is expressed using the equivalent circuit shown in FIG. 4.

The photodetector array 58 comprises about 2000×2000 to 4000×4000 pixels, and has an array area of about 200 mm×200 mm to 500 mm×500 mm. In FIG. 5, the photodetector array 58 comprises 4096×4096 pixels, and has an array area of 430 mm×430 mm. Therefore, one pixel size is about 105 µm×105 µm. 4096 pixels arranged in the horizontal direction to form one block, and 4096 blocks are arranged in the vertical direction to form a two-dimensional matrix.

In FIG. 5, the photodetector array consisting of 4096×4096 pixels is formed on a single substrate, but four photodetector arrays each having 2048×2048 pixels may be combined. In this case, although labor for assembling the four photodetector arrays is required, since the yield of each photodetector array can be improved, the total yield can also be improved.

As has been explained using FIGS. 2 and 4, one pixel comprises one photodetector 80 and switching TFT 82. Photoelectric conversion elements PD(1,1) to PD(4096, 4096) correspond to the photodetector 80, and transfer switches SW(1,1) to SW(4096, 4096) correspond to the switching TFT 82. The gate electrode of a photoelectric conversion element PD(m, n) is connected to a column signal line Lcm common to that column via a corresponding switch SW (m, n). For example, photoelectric conversion elements PD(1, 1) to PD(4096, 1) of the first column are connected to a first column signal line Lc1. The common electrode (D electrode) of each photoelectric conversion element PD(m, n) is connected to a bias power supply 85 via a bias line Lb.

The control terminal of a switch SW(m, n) of a given row is connected to a common row select line Lrn. For example, the switches SW(1, 1) to SW(1, 4096) of the first row are connected to a row select line Lr1. Row select lines Lr1 to Lr4096 are connected to the image sensing controller 24 via a line selector 92.

The line selector 92 comprises an address decoder 94 which decodes a control signal from the image sensing controller 24 and determines a line from which signal charges of photoelectric conversion elements are to be read, and 4096 switches 96 which are turned on/off in accordance with the output from the address decoder 94. With this arrangement, signal charges of photoelectric conversion elements PD(m, n) connected to switches SW(m, n), which are connected to an arbitrary line Lrn, can be read. In the simplest arrangement, the line selector 92 may comprise a shift register used in a liquid crystal display or the like.

Column signal lines Lc1 to Cl4096 are connected to a signal read circuit 100, which is controlled by the image sensing controller 24. In the signal read circuit 100, reference numerals 102-1 to 102-4096 denote reset switches for respectively resetting the column signal lines Lc1 to Lc4096 to a reset reference potential 101. Reference numerals 106-1 to 106-4096 denote pre-amplifiers for amplifying signal potentials from the column signal lines Lc1 to Lc4096, respectively; 108-1 to 108-4096, sample/hold (S/H) circuits for sampling and holding the outputs from the pre-amplifiers 106-1 to 106-4096; 110, an analog multiplexer for multiplexing the outputs from the S/H circuits 108-1 to 108-4096 on the time axis; and 112, an A/D converter for converting an analog output from the multiplexer 110 into a digital signal. The output from the A/D converter 112 is supplied to the image processor 26.

In the photodetector array shown in FIG. 5, 4096×4096 pixels are divided into 4096 columns by the column signal lines Lc1 to Lc4096, signal charges from 4096 pixels per row are simultaneously read, the read charges are transferred to the analog multiplexer 110 via the column signal lines Lc1 to Lc4096, pre-amplifiers 106-1 to 106-4096, and S/H circuits 108-1 to 108-4096, the transferred charges are multiplexed by the analog multiplexer 110 on the time axis, and the multiplexed signal is converted into a digital signal by the A/D converter 112.

In FIG. 5, the signal read circuit 100 is illustrated to have only one A/D converter 112. However, in practice, four to 32 A/D converters simultaneously execute A/D conversion. This is because it is required to shorten the image signal read time without needlessly increasing the analog signal band and A/D conversion rate. The signal charge accumulation time and A/D conversion time are closely related. If A/D conversion is done at high speed, the bandwidth of an analog circuit broadens, and it becomes difficult to attain a desired S/N ratio. For this reason, it is normally required to shorten the image signal read time without needlessly increasing the A/D conversion rate. In this case, the output from the multiplexer 110 can be A/D-converted using many A/D converters. However, if a large number of A/D converters are used, the cost increases accordingly. Therefore, in consideration of the above situations, an appropriate number of A/D converters are used.

Since the X-ray irradiation time is approximately 10 to 500 msec, it is appropriate to set the capture time or charge accumulation time of the entire frame on the order of 100 msec or shorter.

For example, in order to drive all pixels in turn and to capture an image in 100 msec, if the analog signal frequency band is set to be about 50 MHz and A/D conversion is done at a sampling rate of 10 MHz, at least four A/D converters are required. In this embodiment, 16 A/D converters simultaneously execute A/D conversion. The outputs from the 16 A/D converters are input to 16 memories (FIFOs or the like; not shown). By selectively switching these memories, image data corresponding to one, continuous scan line is transferred to the image processor 26.

Figure 6:
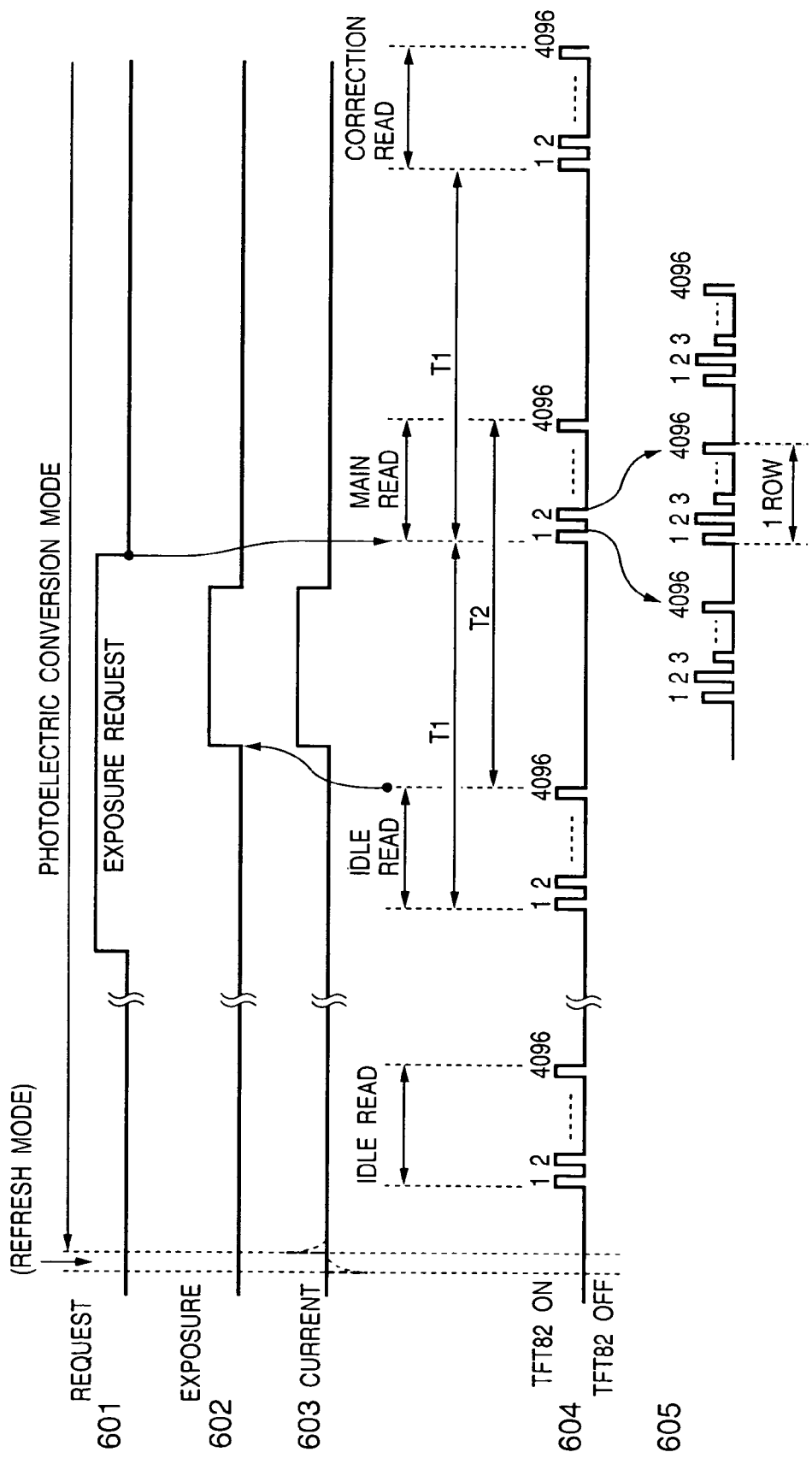
FIG. 6 is a timing chart showing an outline of a sensor read process.

FIG. 6 is a timing chart showing an outline of a sensor read process, and the two-dimensional drive process upon sensing a still image by one-shot X-ray irradiation will be explained below using both FIGS. 5 and 6.

Reference numeral 601 denotes an exposure request control signal to the X-ray source; 602, an X-ray exposure state; 603, a current of the constant current source 81 in the sensor; 604, a control state of the row select line Lrn; and 605, an analog input to the A/D converter 112.

In the equivalent circuit sensor shown in FIG. 2, the driver 62 sets the bias line to be a bias value Vr in the refresh mode, connects all the column signal lines Lc1 to Lc4096 to the reset reference potential 101 to reset them to an initial bias value of the column signal lines Lc, and applies a positive voltage Vgh to all the row select lines Lr1 to Lr4096. As a result, the switches SW(1, 1) to SW(4096, 4096) are turned on, and the G and D electrodes of all the photoelectric conversion elements are respectively refreshed to Vbt and Vr.

After that, the driver 62 sets the bias line Lb to be a bias value Vs in the photoelectric conversion mode, disconnects all the column signal lines Lc1 to Lc4096 from the reset reference potential 101, and applies a voltage Vg1 to all the row select lines Lr1 to Lr4096 to turn off the switches SW(1, 1) to SW(4096, 4096). In this manner, the control enters the photoelectric conversion mode.

Since the following operations are common to the equivalent circuit sensors shown in FIGS. 2 and 4, they will be explained simultaneously.

All the column signal lines Lc are connected to the reset reference potential 101 while the bias line maintains the bias value Vs in the photoelectric conversion mode, thereby resetting the column signal lines. After that, a positive voltage Vgh is applied to the row select line Lr1 to turn on the switches SW(1, 1) to SW(1, 4096), thus resetting the G electrodes of the photoelectric conversion elements of the first column to Vbt. A positive voltage Vg1 is then applied to the row select line Lr1 to turn off the switches SW(1, 1) to SW(1, 4096). Row selection is repeated in turn to reset all the pixels, thus completing photographing preparation. The aforementioned operation is substantially the same as the signal charge read operation, except for whether or not signal charges are captured. Hence, this reset operation will be referred to as an "idle read" operation hereinafter. During this idle read operation, it is possible to simultaneously set all the row select lines Lr at Vgh. However, in this case, the signal line potential largely deviates from the reset voltage Vbt at the time of completion of read preparation, and it becomes difficult to obtain a high S/N signal. In the above example, the row select lines are reset in turn from 1 to 4096, but they can be reset in an arbitrary order under the control of the driver 62 on the basis of the setup of the image sensing controller 24.

The idle read operation is repeated, and the control waits for an X-ray exposure request.

Upon generation of the exposure request, the idle read operation is redone to prepare for image capture, i.e., X-ray exposure. Upon completion of image capture preparation, X-ray exposure starts in accordance with an instruction from the image sensing controller 24.

After X-ray exposure, signal charges on the photoelectric conversion elements 80 are read. A voltage Vgh is applied to a row select line Lr corresponding to an arbitrary row (e.g., Lr1) of the photoelectric conversion element array to output accumulated charge signals onto the signal lines Lc1 to Lc4096. From the column signal lines Lc1 to Lc4096, signals for 4096 pixels are simultaneously read column by column.

A voltage Vgh is applied to another row select line Lr (e.g., Lr2) to output accumulated charge signals onto the signal lines Lc1 to Lc4096. From the column signal lines Lc1 to Lc4096, signals for 4096 pixels are simultaneously read column by column. By repeating this operation in turn for 4096 signal lines, all the pieces of image information are read.

During the above operations, the charge accumulation time of each sensor is defined by the time period from when the reset operation is completed, i.e., the TFT 82 is turned off in the idle read operation, until that TFT 82 is turned on to read a charge. Therefore, the respective row select lines have different accumulation time periods and timings.

After an X-ray image is read, a correction image is captured. This correction image is correction data which is used to correct the X-ray image, and is required to capture a high-quality image. The basic image capture method is substantially the same as the X-ray image capture method, except that no X-ray exposure is made. The charge accumulation time upon reading an X-ray image is the same as that upon reading the correction image.

When high-resolution image information is not required or when image data is captured at high speed, all pieces of image information need not always be captured, and the image sensing controller 24 sets decimation, pixel average, and region extraction drive instructions in the driver 62 in accordance with the photographing method selected by the operator 21.

Decimation is attained as follows. That is, when the row select line Lr1 is selected, and signals are output from the column signal lines Lc, a read operation for each column is made by, e.g., incrementing n (n: natural number) of Lc2n−1 by one from zero. After that, upon selecting a row, m (m: natural number) of a row select line Lr2m−1 is incremented by one from 1 to read signals for one row. In this example, the number of pixels is decimated to ¼. Also, the driver 62 decimates the number of pixels to ⅛, ¹⁄16, and the like in accordance with the setup instruction of the image sensing controller 24.

As for the pixel average, during the aforementioned operations, a voltage Vgh is simultaneously applied to row select lines Lr2m and Lr2m+1 to simultaneously turn on TFTs (2m, 2n) and (2m+1, 2n), thus allowing analog addition of two pixels in the column direction. In this process, the number of pixels to be added is not limited to two, but a plurality of pixels in the column signal line direction can easily undergo analog addition. Furthermore, as for addition in the row direction, when neighboring pixels (Lc2n and Lc2n+1) undergo digital addition after A/D conversion, the sum of a 2×2 pixel matrix can be obtained in combination with the above analog addition. In this manner, data can be read at high speed without wasting irradiated X-rays. As another method of achieving a high-speed process by reducing the total number of pixels, a method of limiting the image capture region is available.

In this method, the operator 21 inputs a required region from the operator interface 22, the image sensing controller 24 issues an instruction to the driver 62 on the basis of the input region, and the driver 62 changes the data capture range to drive the two-dimensional photodetector array.

In this embodiment, in a high-speed capture mode, 1024×1024 pixels are captured at 30 F/S. That is, the addition process of 4×4 pixels is executed for the entire region of the two-dimensional photodetector array to decimate pixels to 1/16. In the smallest range, an image of a 1024×1024 region is sensed without decimation. With this image sensing, a digital zoom image is obtained.

Figure 7:
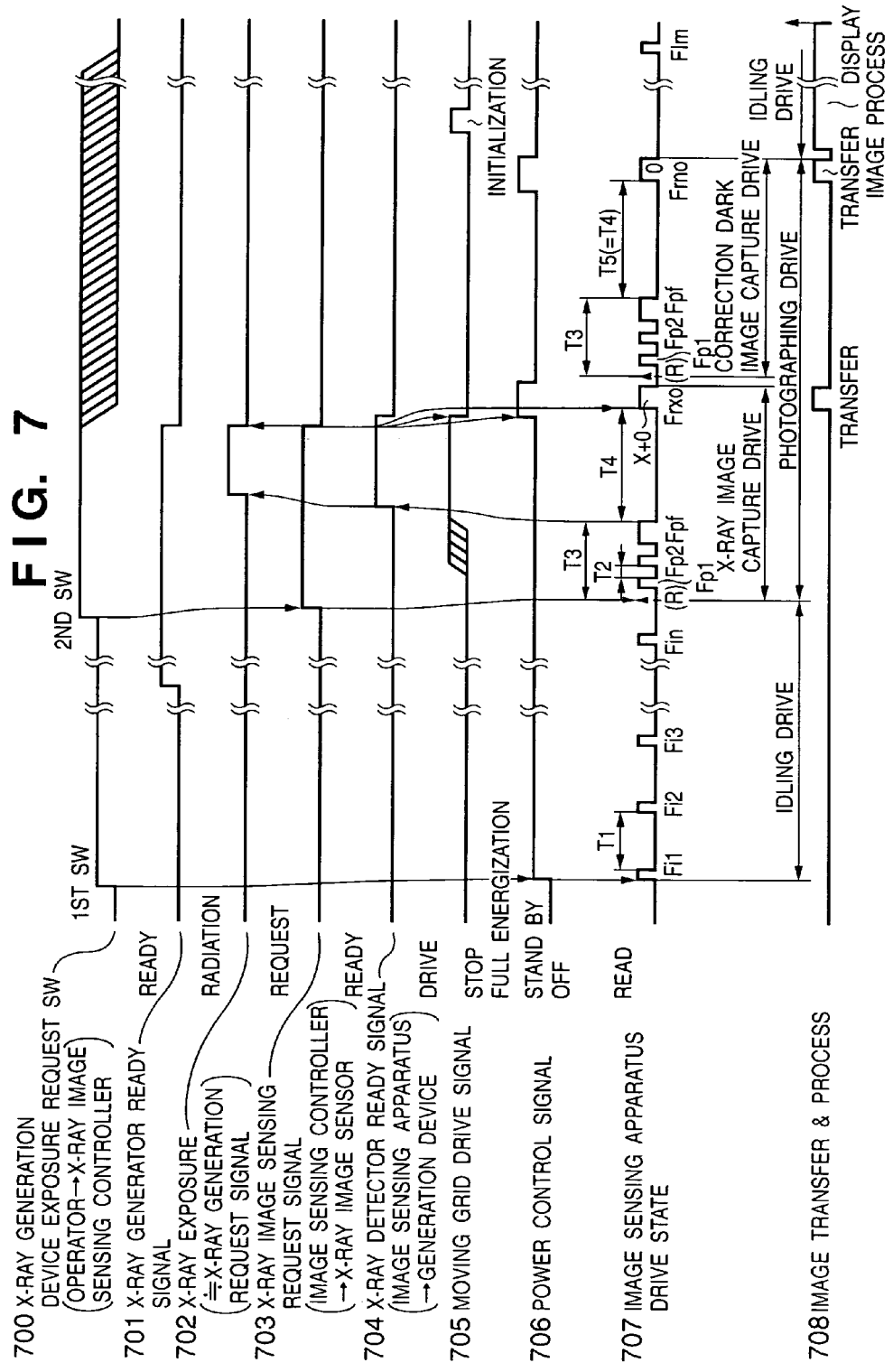
FIG. 7 is a timing chart including an image sensing operation of an X-ray detector.

FIG. 7 is a timing chart including the image sensing operation of the X-ray detector 52. The operation of the X-ray detector 52 will be explained below mainly using FIG. 7. Reference numeral 701 denotes an image sensing request signal to the operator interface 22; 702, an actual X-ray exposure state; 703, an image sensing request signal from the image sensing controller 24 to the driver 62 on the basis of an instruction of the operator 21; 704, a photographing ready signal of the X-ray detector 52; 705, a drive signal of the grid 54; 706, a power control signal in the X-ray detector 52; and 707, a drive state of the X-ray detector (especially, a charge read operation from the photodetector array 58). Reference numeral 708 generally denotes a transfer state, image process, and display state of image data.

The driver 62 stands by while setting the power control OFF, as indicated by 706, until it receives a detector preparation request or photographing request from the operator 21. More specifically, in FIG. 5, the driver 62 maintains the potentials of the row select lines Lr, column signal lines Lc, and bias line Lb to be the same potential (especially, signal GND level) using switches (not shown), and does not apply any bias to the photodetector array 58. Furthermore, the driver 62 may maintain the potentials of the row select lines Lr, column signal lines Lc, and bias line Lb to be the GND potential by shutting off the signal read circuit 100, line selector 92, and power supplies including the bias power supply 84 or 85.

When the operator 21 inputs a photographing preparation request instruction (701: 1st SW) at the operator interface 22, the image sensing controller 24 shifts the X-ray generator 40 to a photographing ready state, and issues an instruction for shifting the X-ray detector 52 to a photographing preparation state to the X-ray detector 52. Upon receiving the instruction, the driver 62 applies a bias to the photodetector array 58 and repeats (refresh and) idle read frames Fi. The request instruction is issued to start preparation for the X-ray detector 52 when the 1st switch (normally, rotor up of the tube or the like starts) of an exposure request SW to the X-ray generation device or the X-ray detector 52 requires a predetermined period of time (several sec or more) for photographing preparation. In this case, the operator 21 need not intentionally issue the photographing preparation request instruction. That is, when the operator inputs patient information, photographing information, or the like at the operator interface 22, the image sensing controller 24 may interpret that information as a detector preparation request instruction, and may shift the X-ray detector 52 to a detector preparation state.

In the detector preparation state, in order to prevent the capacitors 80b (80c) from being held in a saturation state due to dark currents gradually accumulated in the photodetectors 80 in the photoelectric conversion mode after idle read, (refresh R and) idle read frames Fi are repeated at predetermined intervals. This drive process to be done during a period in which no actual X-ray exposure request is generated after generation of the photographing preparation request from the operator 21, i.e., the drive process that repeats idle read frames Fi to be done in the detector preparation state at predetermined time intervals T1, will be referred to as "idling drive" hereinafter, and the period of the detector preparation state in which the idling drive is done will be referred to as an "idling drive period" hereinafter. Since the duration of the idling drive period is not defined (not specified) in practical use, idling-dedicated idle read frames Fi in which T1 is set to be longer than a normal photographing operation and the ON time period of the TFTs 82 is shorter than a normal read drive frame Fr are made so as to minimize read operations that impose heavy loads on the photodetector array 58 (especially, TFTs 82). In case of a sensor that requires a refresh R operation, the refresh R operation is made once per several idle read frames Fi.

The X-ray image capture process around the X-ray detector 52 will be explained below.

The drive process of the X-ray detector 52 upon capturing an X-ray image roughly includes two image capture processes. As indicated by 707, one process is an X-ray image capture drive process, and the other process is a correction dark image capture drive process. These drive processes are substantially the same, except for whether or not X-ray exposure is made. Furthermore, each drive process includes three parts, i.e., an image sensing preparation sequence, charge accumulation (exposure window), and image read.

The X-ray image capture process will be explained in turn below.

When the operator 21 inputs a photographing request instruction (701: 2nd SW) at the operator interface 22, the image sensing controller 24 controls the photographing operation while synchronizing the X-ray generator 40 and X-ray detector 52. That is, the controller 24 asserts an image sensing request signal to the X-ray detector at a timing indicated by the X-ray exposure request signal 703 in accordance with the photographing request instruction (701: 2nd SW). The driver makes predetermined image sensing preparation sequence drive, as indicated by the image sensing drive state 707, in response to the image sensing request signal.

More specifically, the refresh operation is done if it is required, a predetermined number of times of charge sweep-out idle read frames FP for the image sensing sequence and a charge accumulation start-dedicated idle read frame Fpf are executed, and the control shifts to the charge accumulation state (image sensing window: T4). In this case, the number of times and time intervals T2 of the charge sweep-out idle read frames Fp are determined based on values set by the image sensing controller 24 prior to the image sensing request. An optimal drive process is automatically selected depending on whether importance is attached to operability or image quality, or an image sensing portion in accordance with the request from the operator 21.

Normally, a drive process is made in a short period of time (about 1 ms) to improve response to the exposure request. Since a period (T3) from the exposure request until completion of photographing preparation is required to be short in practical use, the image sensing preparation sequence charge sweep-out idle read frame Fp is executed for this purpose. Upon generation of the exposure request, since the image sensing preparation sequence drive immediately starts independently of the idling drive state, the period (T3) from the exposure request until completion of photographing preparation can be shortened, thereby improving operability.

The driver 62 begins to move the grid 54 in synchronism with image sensing preparation of the photodetector array 58. This is to sense an image in an optimal moving state of the grid in synchronism with actual X-ray exposure 702. In this case, as well, the grid begins to move at an optimal grid movement start timing and optimal grid moving speed, which are set by the image sensing controller.

Since this embodiment recognizes vibrations generated upon operation of the grid 54 as a problem, the start of the grid 54 is controlled to minimize a change in acceleration, and the grid 54 is preferably controlled to move at a constant speed upon executing the charge accumulation start-dedicated idle read frame Fpf which is readily influenced by vibrations.

When the X-ray detector 52 is ready to sense an image, the driver 62 returns an X-ray detector ready signal 704 to the image sensing controller 24, which asserts an X-ray generation request signal 702 to the X-ray generator 40 on the basis of the change in signal 704. The X-ray generator 40 generates X-rays while it receives the X-ray generation request signal 702.

After a predetermined X-ray dose is generated, the image sensing controller 24 negates the X-ray generation request signal 702, and also negates the X-ray image sensing request signal 703 to inform the X-ray detector 52 of an image capture timing. Based on this timing, the driver 62 immediately stops the grid 54, and starts the operation of the signal read circuit 100, which is in the standby state. After an elapse of the stop time of the grid 54 and a predetermined wait time required until the signal read circuit 100 becomes stable, image data is read out from the X-ray photodetector array 58 based on the driver 62, thus capturing a raw image in the image processor 26. Upon completion of transfer, the driver 62 sets the read circuit 100 in the standby state again.

Since this embodiment recognizes vibrations generated upon operation of the grid 54 as a problem, it is desirable that the grid 54 reaches constant-speed motion (including a still state) before driving of an X-ray image capture frame Frxo, which is most readily influenced by vibration noise. Furthermore, a vibration sensor may be attached inside the X-ray detector 52 to measure vibrations, and after it is confirmed vibrations caused by the grid or other factors have subsided to a predetermined value or less, the driving of the X-ray image capture frame Frxo may be started.

Subsequently, the X-ray detector 52 captures a correction image. That is, the previous image sensing sequence for image sensing is repeated to capture a dark image without X-ray irradiation, and the correction dark image is transferred to the image processor 26.

At this time, the image sensing sequence may have a slightly different X-ray exposure time or the like for each photographing. An image with higher quality can be obtained by reproducing the same photographing sequence as well as such different X-ray exposure time upon capturing a dark image. However, the grid 54 stands still upon capturing a dark image so as to suppress the influence of vibrations. After the dark image is captured, the grid 54 is initialized at a predetermined timing that does not influence image quality.

Figure 8:
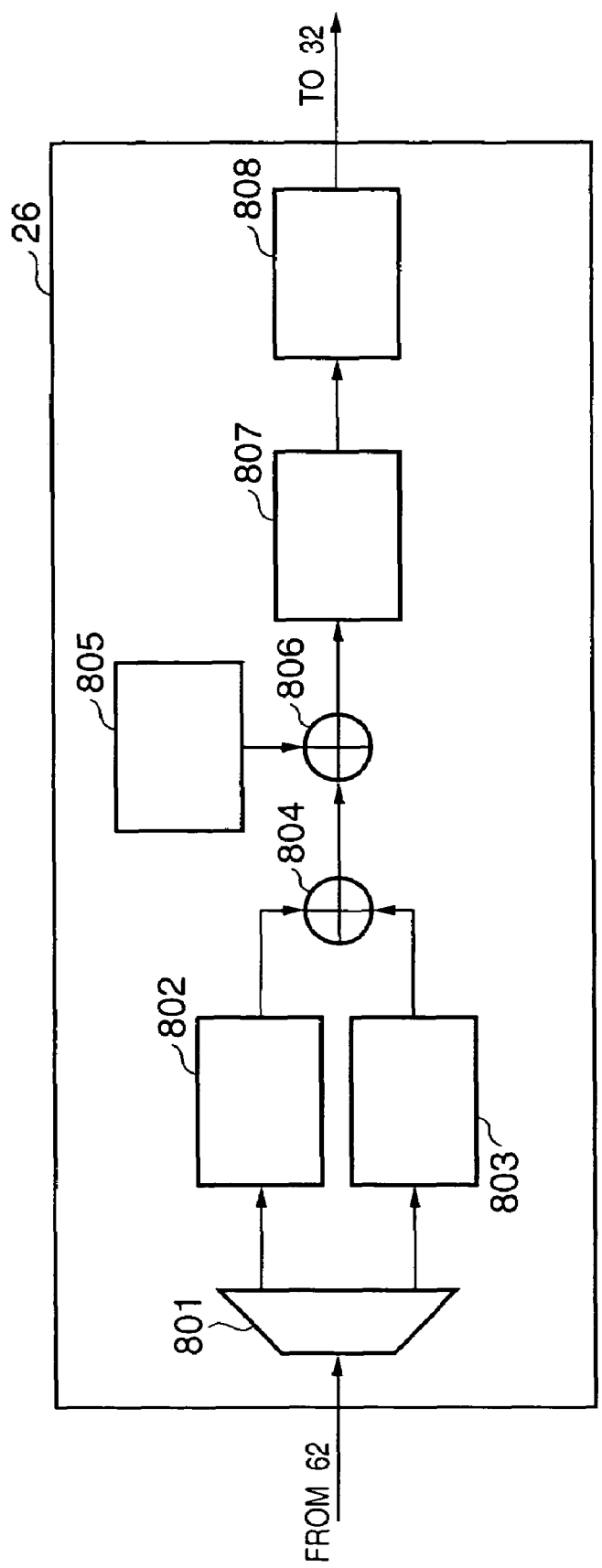
FIG. 8 is a schematic block diagram showing the arrangement of an image processor.

FIG. 8 shows the image processor 26, and also the flow of image data. Reference numeral 801 denotes a multiplexer for selecting a data path; 802 and 803, frame memories for an X-ray image and dark image, respectively; 804, an offset correction circuit; 805, a gain correction data frame memory; 806, a gain correction circuit; 807, a defect correction circuit; and 808, another image processing circuit.

An X-ray image captured by the X-ray image capture frame Frxo in FIG. 7 is stored in the X-ray image frame memory 802 via the multiplexer 801, and a correction image captured by the correction image capture frame Frno is similarly stored in the dark image frame memory 803 via the multiplexer 801. After the dark image is stored, the offset correction circuit 804 makes offset correction (e.g., Frxo−Frno), and the gain correction circuit 806 then makes gain correction (e.g., (Frxo−Frno)/Fg) using gain correction data Fg, which is captured in advance and is stored in the gain correction frame memory.

Subsequently, image data transferred to the defect correction circuit 807 is continuously corrected to prevent unnaturalness at defective pixels, joint portions of the X-ray detector 52, which is formed by a plurality of panels, and the like, thus completing a sensor-dependent correction process resulting from the X-ray detector 52. Furthermore, the image data undergoes other general image processes such as a tone process, frequency process, emphasis process, and the like by the image processing circuit 808, and the processed data is transferred to the display controller 32 to display a taken image on the monitor 30.

Figure 9:
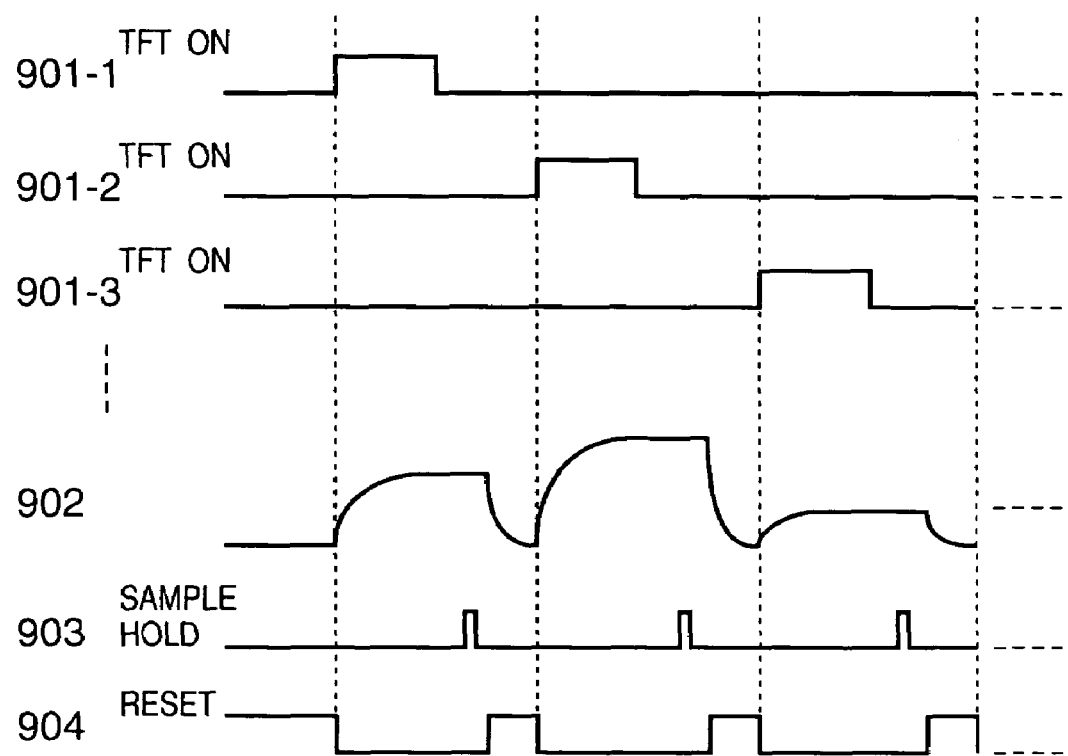
FIG. 9 is a timing chart for explaining a drive process of a dedicated frame.

Prior to the description of the drive process of the dedicated frames in FIG. 7 in this embodiment, the image capture process will be explained again using FIG. 9. Reference numerals 901-1, 902-2, 901-3, . . . denote the outputs from the TFT switch elements 96-1, 96-2, 96-3, . . . ; 902, an analog output from the pre-amplifier 106-n; 903, a control signal of the S/H circuit 108-n; and 904, a control signal of the reset switch 102-n of the column signal line Lc.

The column signal line Lc-n is reset, so that a signal charge can be output onto the column signal line Lc-n. The switch element 901-1 is then turned on to select the row select line Lr-1. A charge signal is output onto the column signal line Lc-n, and the pre-amplifier 902 generates an output corresponding to the received X-ray dose. A time period until this signal output becomes stable is determined by the charge transfer performance (ON resistance: about several MΩ) of the TFT 82, the signal line capacitance (capacitor 86: several pF to several ten pF), and the like. In this embodiment, several ten μs to several hundred μs are required, and the TFT is normally enabled during this period. After the charge transfer becomes stable, the S/H circuit 108-n is controlled (903) to receive the dose signal. A description of the capture system after the S/H circuits will be omitted here.

In order to read a charge on the row select line Lr-2, the column signal lines Lc are reset (904). At the reset completion timing, the row select line Lr-2 is selected (901-2). Likewise, a charge signal corresponding to the X-ray dose is output onto the column signal line Lc-n. After that, dose data are similarly read up to the line Lr-4096. In the idle read operation, charges on the photodetectors 80 are reset by executing the aforementioned operations without capturing any image.

Figure 10:
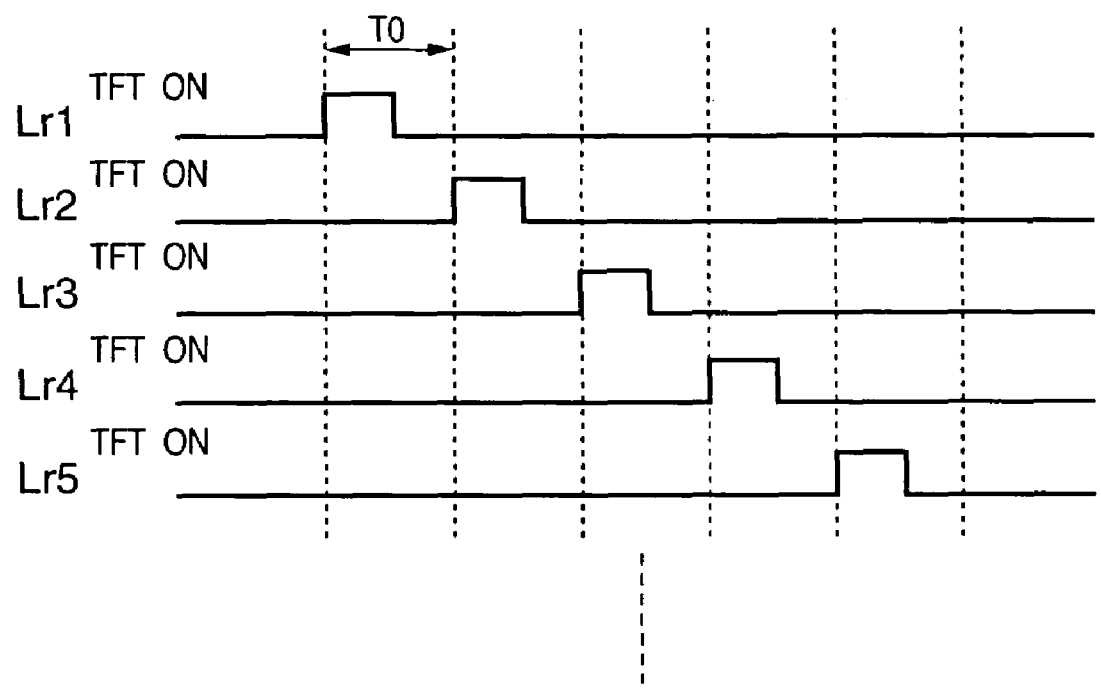
FIG. 10 is a timing chart showing a charge accumulation start-dedicated idle read frame Fpf, X-ray image capture frame Frxo, and correction image capture frame Frno.
Figure 11:
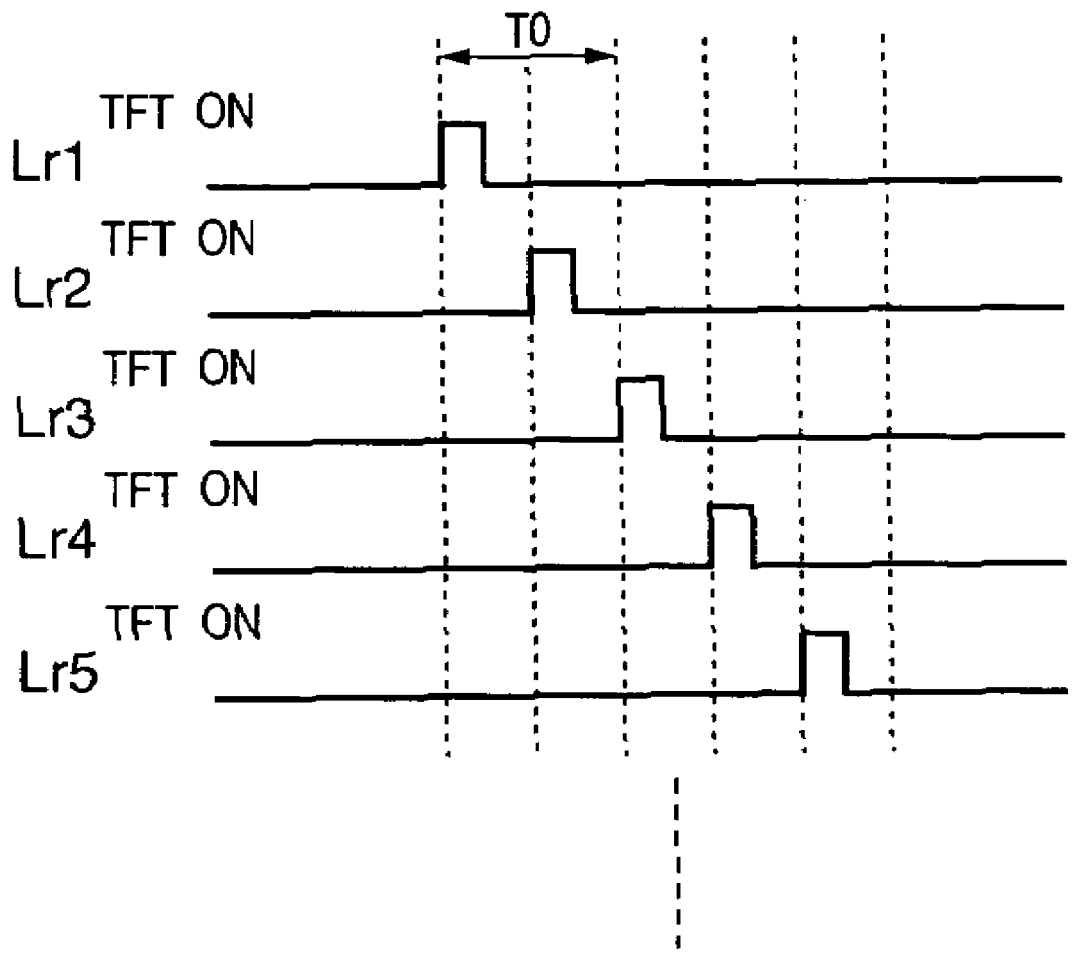
FIG. 11 is a timing chart showing an idling-dedicated idle read frame Fi.
Figure 12:
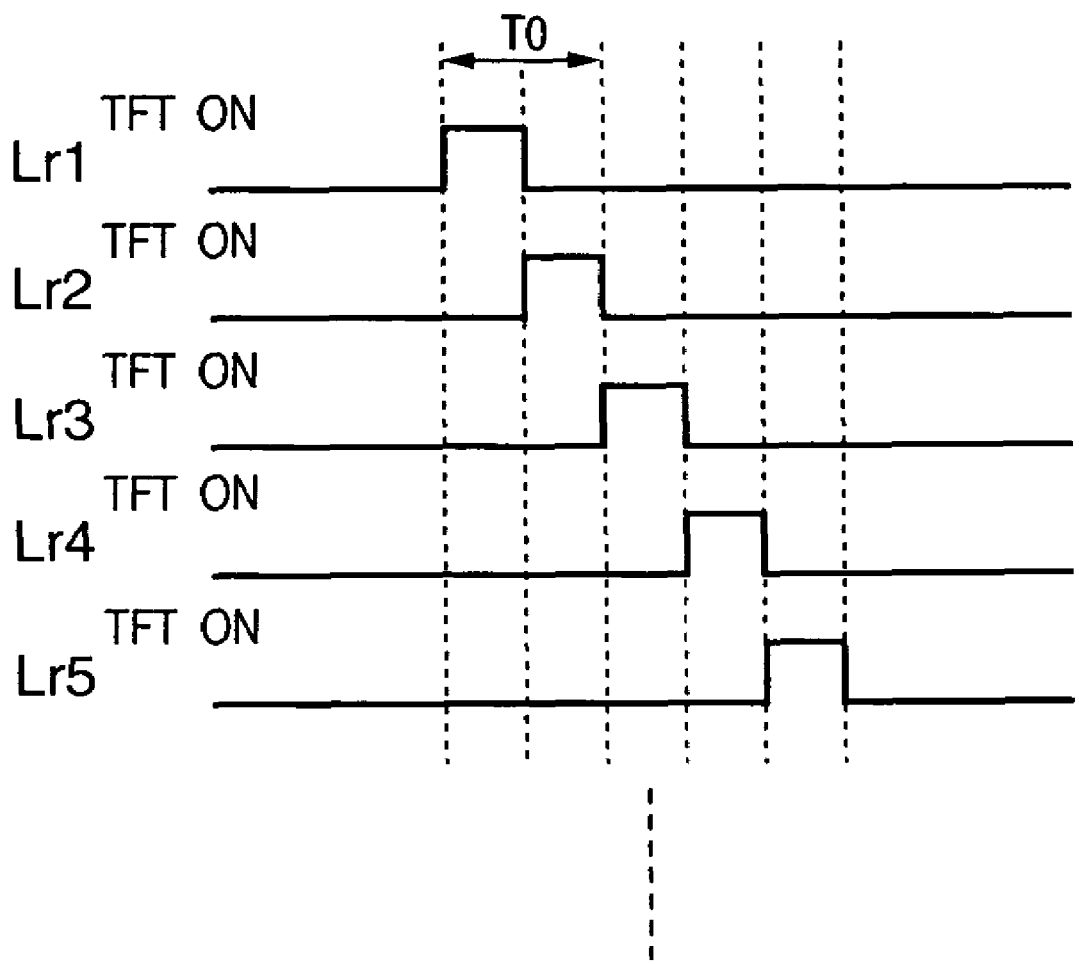
FIG. 12 is a timing chart showing the operation of a TFT 82 of a charge sweep-out idle read frame Fp for an image sensing sequence.

FIG. 10 shows the operations of the charge accumulation start-dedicated idle read frame Fpf, X-ray image capture frame Frxo, and correction image capture frame Frno, FIG. 11 shows the operation of the idling-dedicated idle read frame Fi, and FIG. 12 shows the operation of the charge sweep-out idle read frame Fp for the image sensing sequence.

As is known, the drive process of the X-ray image capture frame Frxo is the same as that of the correction image capture frame Frno. In the charge accumulation start-dedicated idle read frame Fpf, after TFT of each row select line is turned off, accumulation of the photodetector 80 connected to that row select line Lr starts. For this reason, in order to adjust the accumulation times of the respective rows, the image capture frame and charge accumulation start frame must inevitably have the same drive process.

In the idling-dedicated idle read frame Fi, the drive process is done to shorten the ON time of each TFT. In FIG. 11, the read time per line is also halved. In this embodiment, the ON voltage of the TFT is 12 to 20 V, while its OFF voltage is −5 V to GND level.

Therefore, as the ON time of the TFT is longer, the threshold voltage of the TFT shifts, resulting in performance deterioration of the TFT transfer performance.

Figure 13:
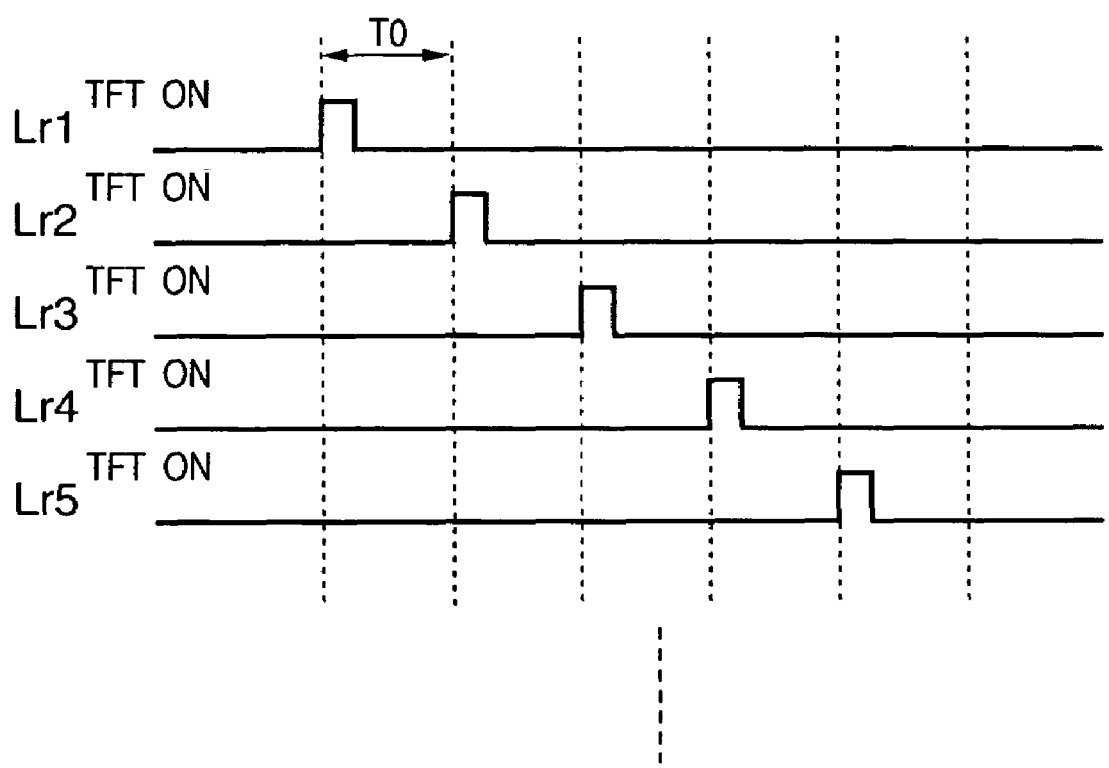
FIG. 13 is a timing chart showing an example of a drive process in which a time period per line is equal to a normal image capture frame, and only the ON time period of a TFT is shortened.

Since the duration of the idling drive period is unknown in practical use, the ON time of the TFT is preferably as short as possible. As described above using FIG. 7, a long interval T1 is assured (>1 sec) between neighboring idling-dedicated idle read frames Fi, and the drive time is halved in the idling-dedicated idle read frame Fi compared to a normal photographing drive time to shorten the ON time of the TFT. Although the ON time of the TFT is halved, since a charge to be transferred is based on only a dark current, no problem is posed in terms of characteristics even by the aforementioned drive process. Just for reference, as shown in FIG. 13, the drive process may be made, so that the time per line remains the same as the normal image capture frame, and only the ON time of the TFT is shortened. In case of a sensor that requires the refresh R operation, since several minutes to several ten minutes are required until a sensor saturation state is reached due to the accumulated dark currents, the refresh R operation can be made once per several idling-dedicated idle read frames Fi.

Since the charge sweep-out idle read frame FP for the image sensing sequence is made for the purposes of sweeping out charges in the photodetectors 80, and of reducing the time period before X-ray exposure, the time required to drive one line is set to be short (½ that of the normal image capture frame in FIG. 12), and the ON time of each TFT is set to be equal to a 1-line drive time to sweep out a charge.

As described above, according to this embodiment, even when the idling drive period which is hard to specify in practical use continues long, highly reliable image sensing can be realized while suppressing a decrease in service life and aging of various characteristics that pertain to detection of the X-ray image sensing apparatus (system).

Figure 14:
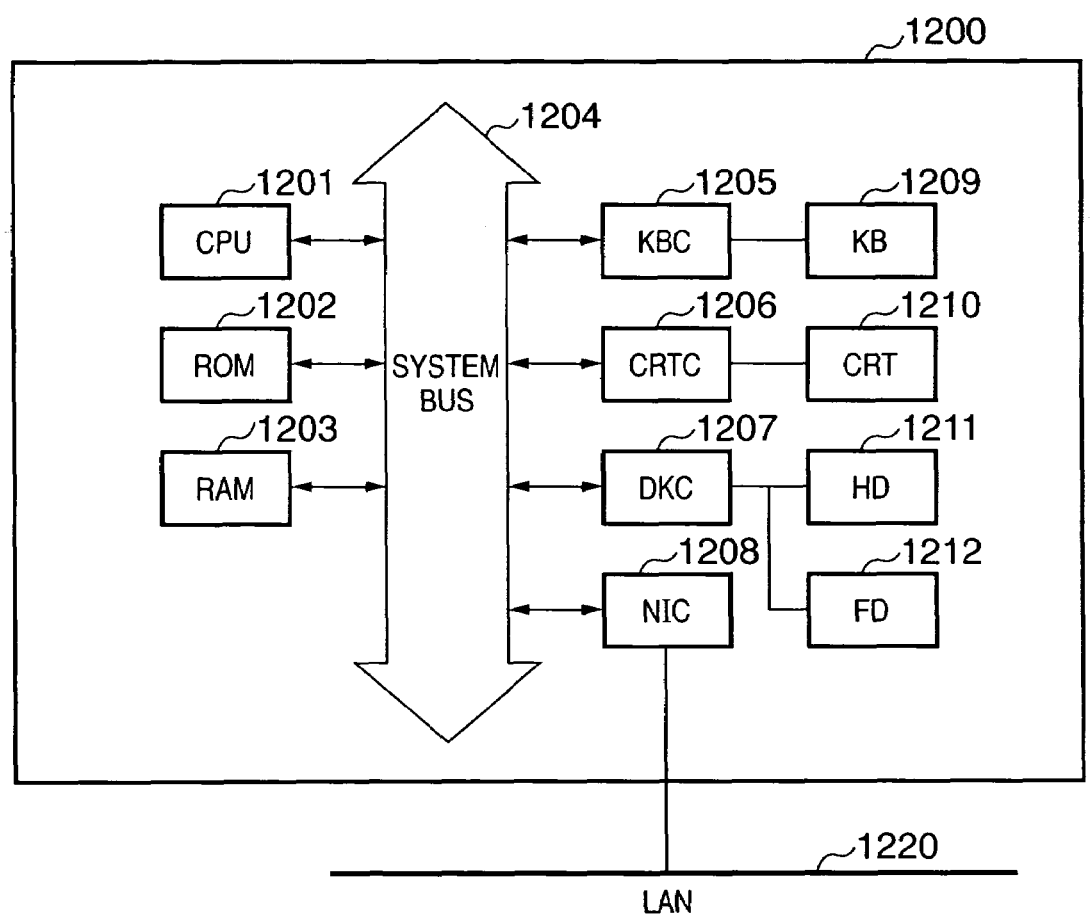
FIG. 14 is a block diagram showing the internal arrangement of a general personal user terminal.

FIG. 14 is a block diagram showing the internal arrangement of a general personal user terminal. Referring to FIG. 14, reference numeral 1200 denotes a computer PC. The PC 1200 comprises a CPU 1201, and executes device control software stored in a ROM 1202 or hard disk (HD) 1211 or supplied from a flexible disk drive (FD) 1212 to systematically control respective devices connected via a system bus 1204.

The CPU 1201 of the PC 1200 and the program stored in the ROM 1202 or hard disk (HD) 1211 implement the functions of respective building components of the X-ray image sensing apparatus (system) of this embodiment.

Reference numeral 1203 denotes a RAM, which serves as a main memory, work area, and the like of the CPU 1201. Reference numeral 1205 denotes a keyboard controller (KBC), which controls instruction inputs from a keyboard (KB) 1209, a device (not shown), and the like.

Reference numeral 1206 denotes a CRT controller (CRTC) which controls display of a CRT display (CRT) 1210. Reference numeral 1207 denotes a disk controller (DKC), which controls accesses to the hard disk (HD) 1211 and flexible disk (FD) 1212, which store a boot program (startup program: a program for starting execution (operation) of hardware and software of a personal computer), a plurality of application programs, edit files, user files, network management program, and the like.

Reference numeral 1208 denotes a network interface card (NIC) which exchanges data in two ways with a network printer, other network devices, or other PCs via a LAN 1220.

The sequence of the X-ray image sensing method explained in this embodiment can be implemented when the program stored in the RAM, ROM, or the like of the computer runs. This program and a computer-readable storage medium that records the program are included in an embodiment of the present invention.

More specifically, the program is supplied to the computer via a recording medium such as a CD-ROM or the like that records the program or various transmission media. As the recording medium which records the program, a flexible disk, hard disk, magnetic tape, magnetooptical disk, nonvolatile memory card, and the like can be used in addition to the CD-ROM. On the other hand, as the program transmission medium, communication media (wired channels such as optical fibers, wireless channels, and the like) in computer network (LAN, WAN such as the Internet or the like, wireless communication network, and the like) system for supplying-program information by transmitting it as a carrier can be used.

Such program is also included in an embodiment of the present invention when the functions of the above embodiment are implemented not only by executing the supplied program by the computer but also by collaboration of the computer, and an OS (operating system) running on the computer, another application software, or the like, and by executing some or all processes of the supplied program by a function extension board or unit of the computer.

According to the image sensing apparatus and image sensing method of the present invention, even when the idling drive period which is hard to specify in practical use continues long, highly reliable image sensing can be realized while suppressing a decrease in service life and aging of various characteristics that pertain to detection of the apparatus.

Second Embodiment

Figure 21:
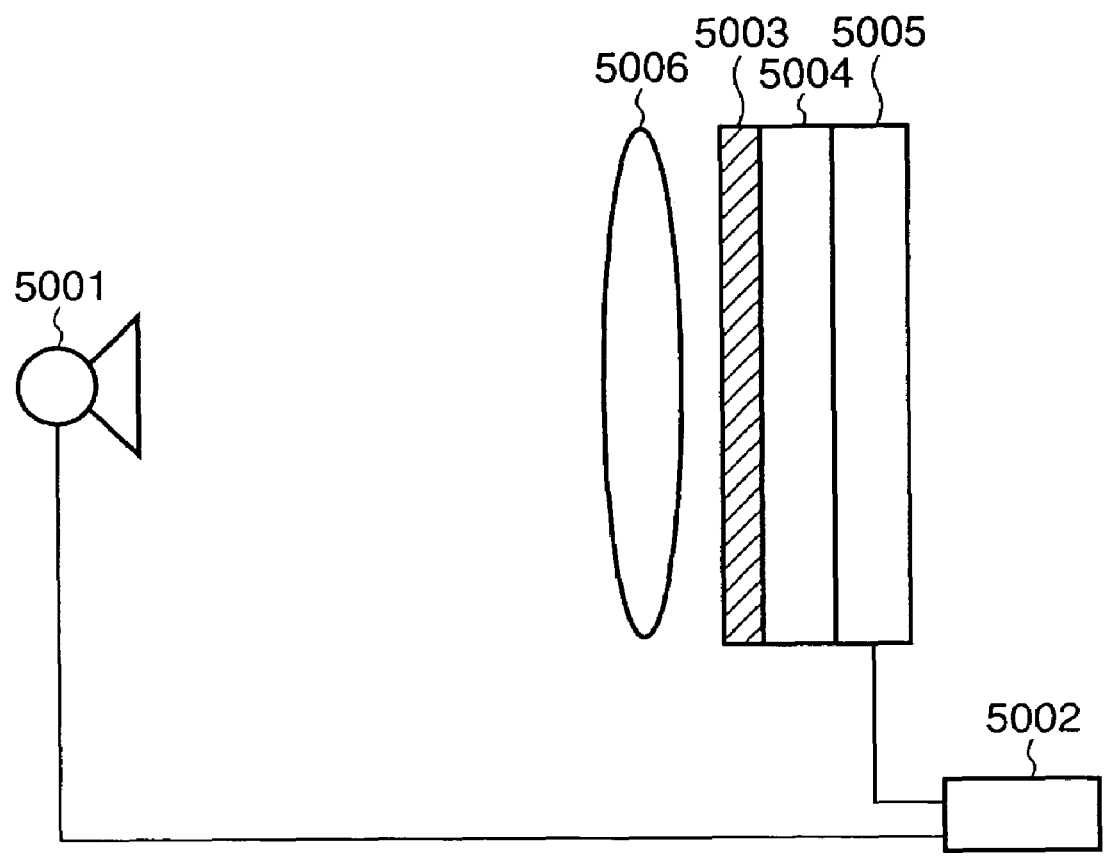
FIG. 21 is a schematic block diagram showing an example of a conventional X-ray photographing system.
Figure 23:
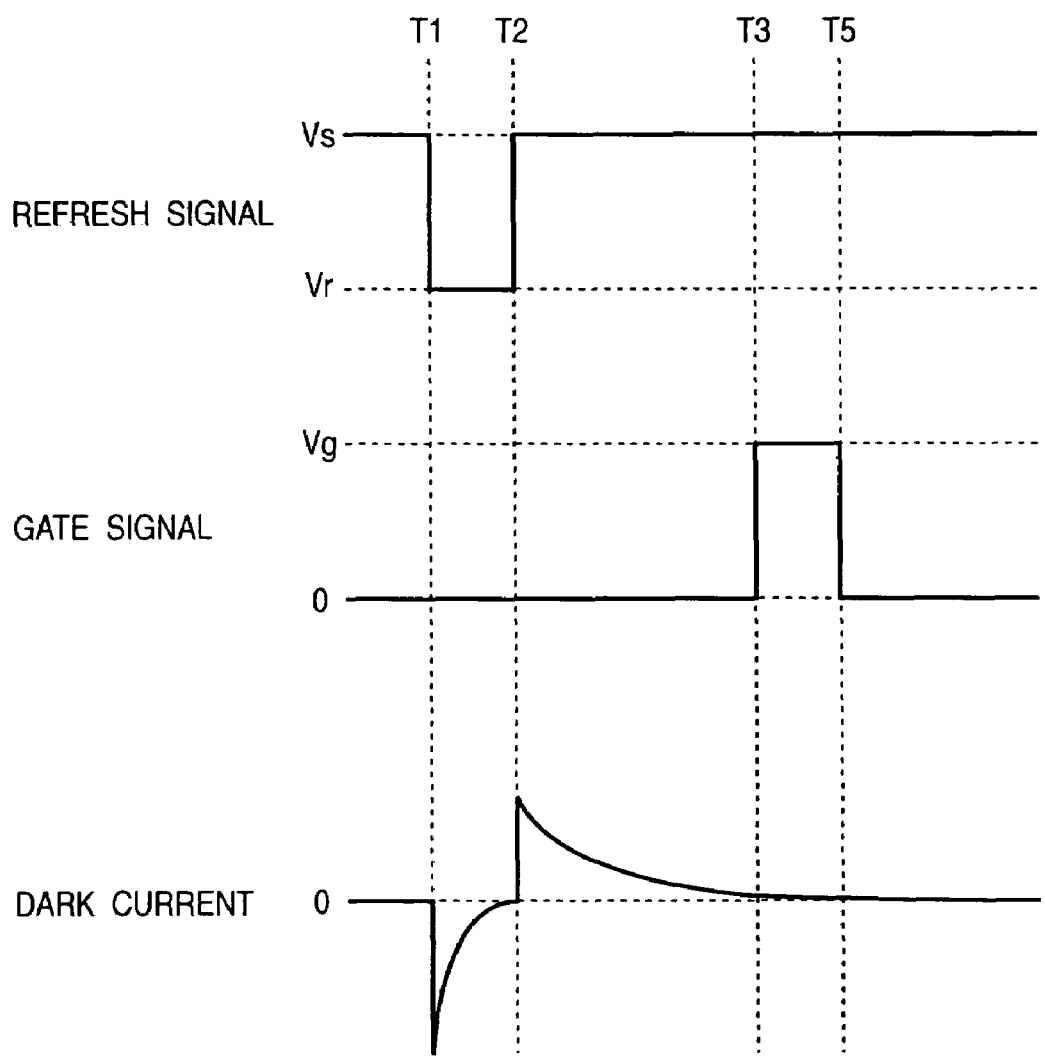
FIG. 23 is a timing chart for explaining the initialization process of one photoelectric conversion element 5020.

In this embodiment, an X-ray photographing system which includes an X-ray photographing apparatus as a combination of a phosphor and photoelectric conversion element and its process will be explained below. The arrangement of the X-ray photographing system of this embodiment is the same as that shown in FIG. 21. Also, since a flat-panel detector 5004 and flat-panel detector controller 5005 of this embodiment are the same as those shown in FIG. 10, a description thereof will be omitted.

Figure 27:
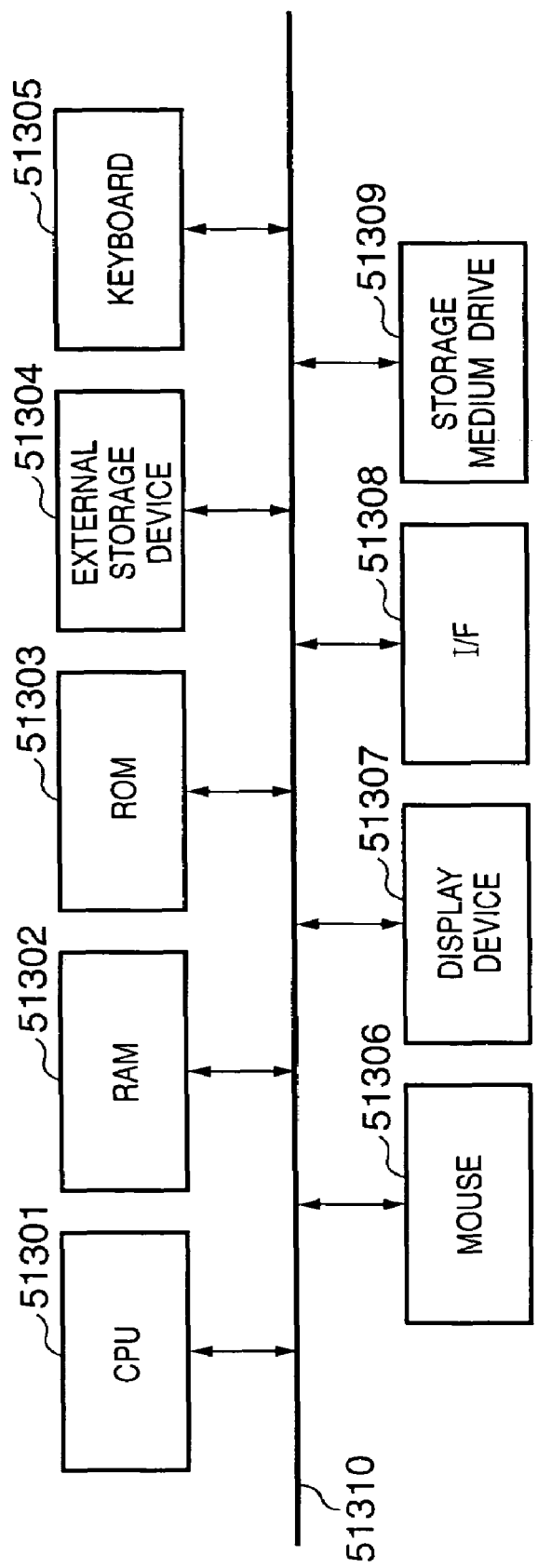
FIG. 27 is a block diagram showing the basic arrangement of a host computer 5002.

FIG. 27 shows the basic arrangement of a host computer 5002 used in this embodiment.

Reference numeral 51301 denotes a CPU which controls the overall host computer 5002 using programs and data stored in a RAM 51302 and ROM 51303, and also controls exchange of signals with an X-ray photographing apparatus 5001 and the flat-panel detector controller 5005.

Reference numeral 51302 denotes a RAM which has an area for temporarily storing programs and data loaded from an external storage device 51304 and storage medium drive 51309, and also a work area temporarily used by the CPU 51301 upon executing respective processes.

Reference numeral 51303 denotes a ROM which stores a boot program, setup data, overall control program, data, and the like of the host computer 5002.

Reference numeral 51304 denotes an external storage device such as a hard disk or the like, which saves programs, data, and the like installed from the storage medium driver 51309. When the work area size has exceeded the size of the RAM 51302, the external storage device 51304 can provide a corresponding area as a file.

Reference numerals 51305 and 51306 denote a keyboard and mouse, respectively, which serve as pointing devices and can input various instructions to the host computer 5002.

Reference numeral 51307 denotes a display device, which comprises a CRT, liquid crystal display, or the like and can display system messages and the like as text information and image information.

Reference numeral 51308 denotes an interface (I/F), which can be connected to networks such as the Internet, LAN, and the like, and external apparatuses. Note that the number of I/Fs is one in FIG. 27. However, the present invention is not limited to this, and a plurality of I/Fs may be provided. In this embodiment, the X-ray photographing apparatus and flat-panel detector controller 5005 can be connected using respective I/Fs and signals can be exchanged with these apparatuses.

Reference numeral 51309 denotes a storage medium drive, which comprises a CD-ROM drive, DVD drive, floppy disk drive, or the like, and can load programs and data from a storage medium such as a CD-ROM, DVD-ROM, or the like.

Reference numeral 51310 denotes a bus for connecting the aforementioned units.

Figure 15:
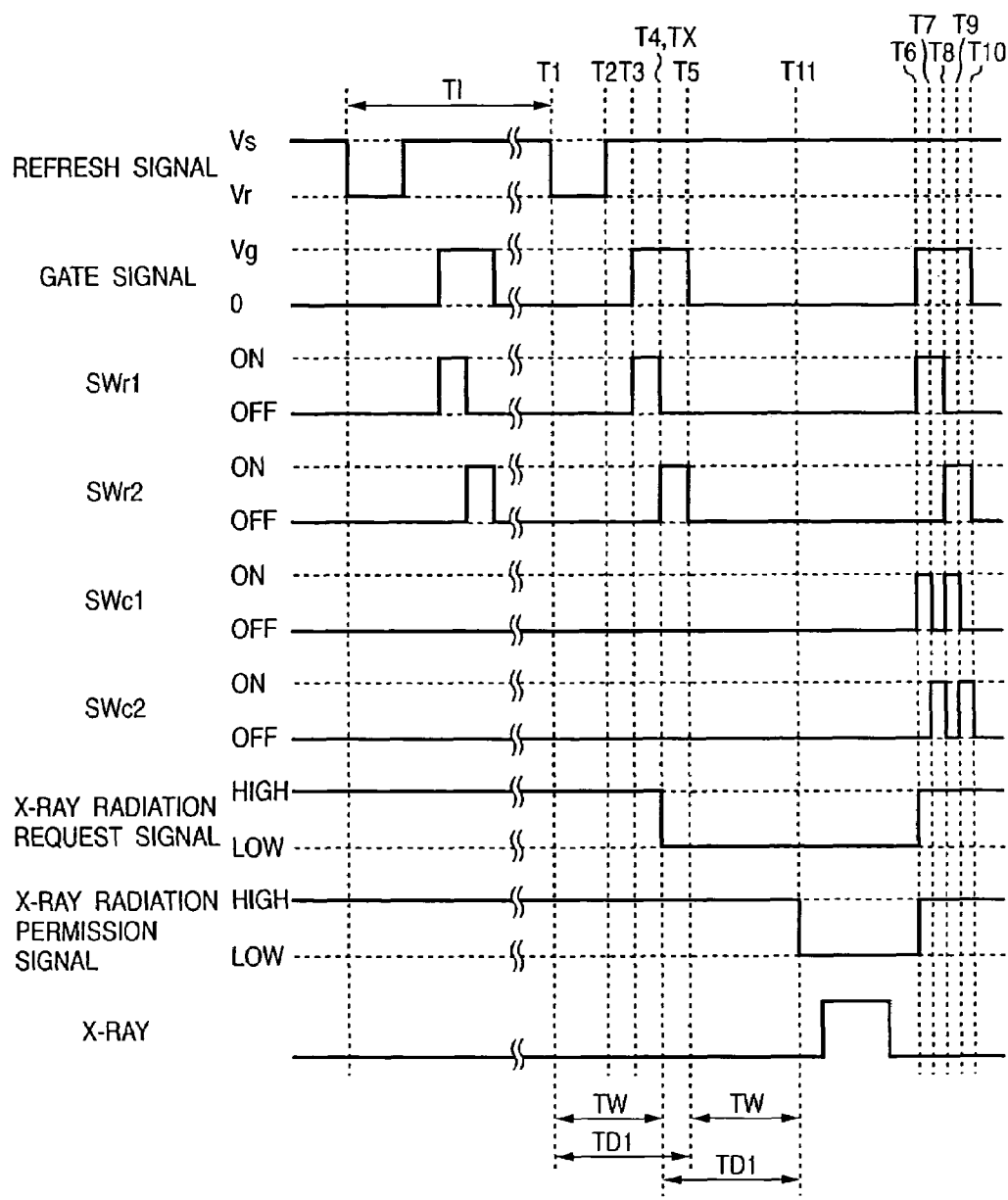
FIG. 15 is a timing chart showing the relationship between the initialization process and X-ray photographing when an X-ray radiation request is generated during the initialization process of photoelectric conversion elements 5020 in the second embodiment of the present invention.

FIG. 15 shows the relationship between the initialization process and X-ray photographing when an X-ray radiation request is generated during the initialization process of photoelectric conversion elements 5020. As shown in FIG. 15, refresh and idle read (initialization) processes are periodically repeated at intervals TI when no X-ray photographing is done.

Figure 28:
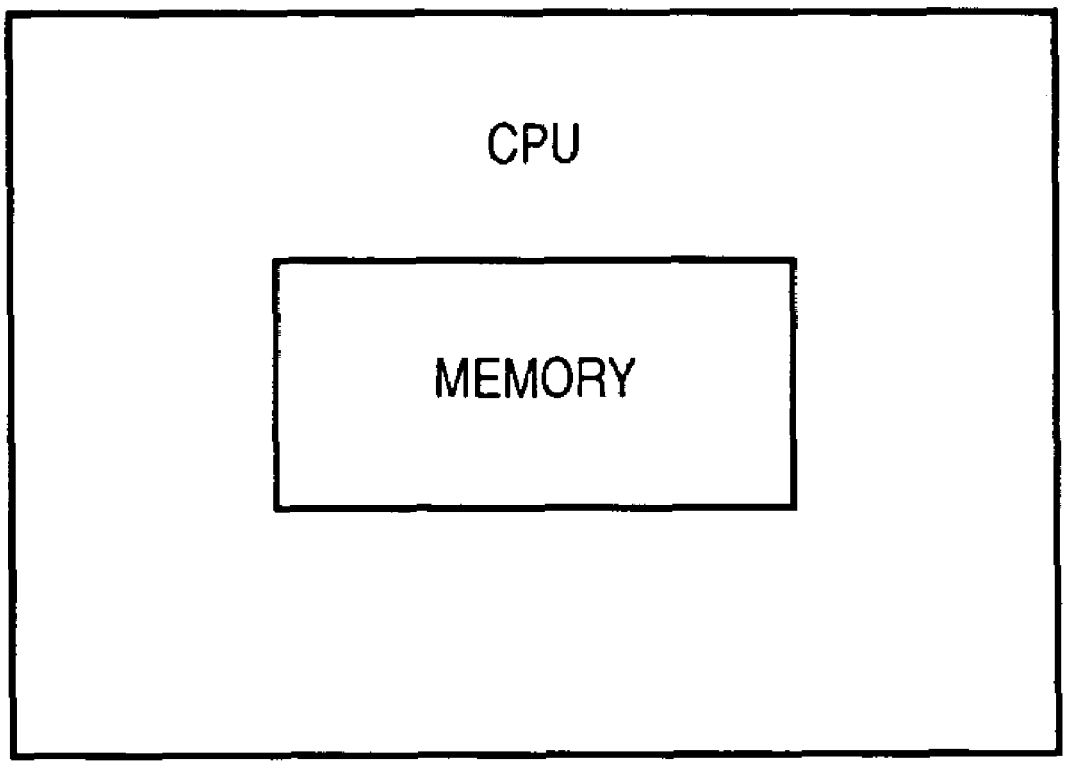
FIG. 28 is a view for explaining a memory included in a CPU 5007.

FIG. 15 shows a case wherein an X-ray radiation switch of an X-ray generation device 5001 has been pressed at time TX during the idle read process, and an X-ray radiation request reaches the flat-panel detector controller 5005 via the host computer 5002. Upon generation of the X-ray radiation request, the host computer 5002 that received this request changes an X-ray radiation request signal to Low. When the X-ray radiation request signal goes Low, the flat-panel detector controller 5005 that received the X-ray radiation request signal stores a time period TW from refresh process start time T1 to the time at which the X-ray radiation request signal goes Low in a memory (see FIG. 28) included in a CPU 5007 (CPU 51301). Note that this memory need not be included in the CPU 5007, but may be arranged outside the CPU 5007.

When the idle read process is completed by setting a gate signal at 0 V at time T5, the control waits for an elapse of the stored time period TW. After the elapse of the time period TW, the flat-panel detector controller 5005 changes an X-ray radiation permission signal to Low at time T11.

After the initialization process, the CPU 5007 of the flat-panel detector controller 5005 reads out TW stored in the aforementioned memory, and waits for an elapse of the time TW (wait process). As a result, a time period TD1 required for the initialization process becomes equal to a time period TD1 from when the X-ray radiation request signal goes Low until the X-ray radiation permission signal changes to Low. Hence, the exposure delay time always becomes a constant time period TD1.

When the X-ray radiation permission signal goes Low, this signal reaches the X-ray generation device 5001 via the host computer 5002, and the X-ray generation device 5001 radiates X-rays, as shown in FIG. 15. The radiated X-rays are transmitted through an object 5006 and are converted by a phosphor 5003 into light proportional to the incoming X-ray dose, and charges corresponding to that light are accumulated on capacitors 5021C.

Upon completion of X-ray radiation, the flat-panel detector controller 5005 changes the X-ray radiation permission signal to High at time T6. When X-ray radiation permission signal goes High, this signal reaches the X-ray generation device 5001 via the host computer 5002, and the X-ray generation device 5001 changes the X-ray radiation request signal to High.

Also, upon completion of X-ray radiation, a gate signal is set to be Vg and a switch SWr1 is turned on at time T6. Then, the voltages at the gate electrodes G of the TFTs 5022(1,1) and 5022(1,2) of the first row shown in FIG. 24 change to Vg, and the charges accumulated on the capacitors 5021C in photodetectors 5021 of the first row are read. The read charges are held by a sample/hold (S/H) circuit 5026 via an amplifier 5025. When the switch SWc1 is turned on at time T6, the held signal of the photodetector 5021(1,1) is converted into a digital value by an A/D converter 5027, and that value is transferred to the host computer. Also, when the switch SWc1 is turned off and the switch SWc2 is turned on at time T7, the held signal of the photodetector 5021(1,2) is converted into a digital value by the A/D converter 5027, and that value is transferred to the host computer 5002.

Figure 24:
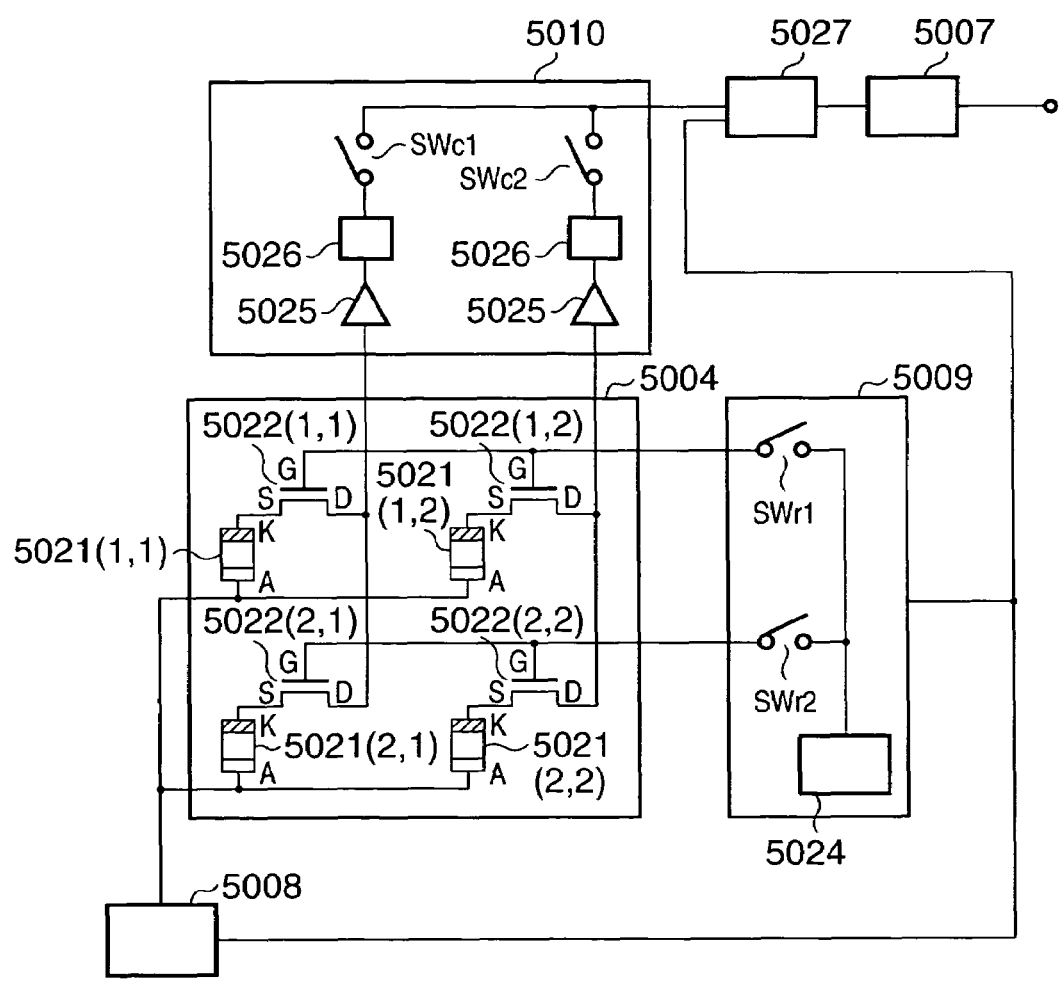
FIG. 24 is a block diagram showing an example of a flat-panel detector 5004 and flat-panel detector controller 5005.
Figure 25:
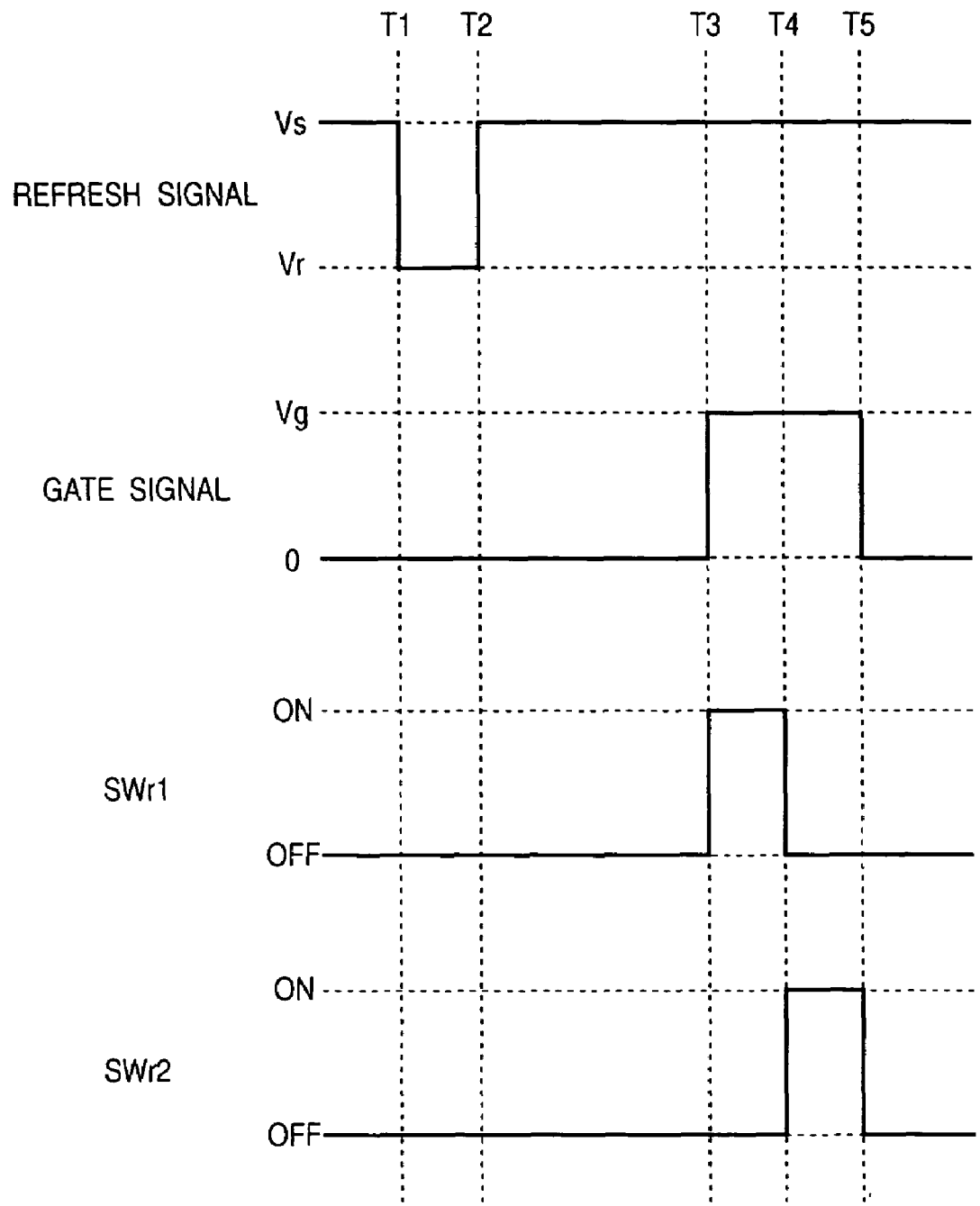
FIG. 25 is a timing chart for explaining the initialization process of a plurality of photoelectric conversion elements 5020.

When the switch SWr1 is turned off and the switch SWr2 is turned on at time T8, the voltages at the gate electrodes G of the TFTs 5022(2,1) and 5022(2, 2) of the second row shown in FIG. 24 change to Vg, and the charges accumulated on the capacitors 5021C in the photodetectors 5021 of the second row are read. The read signals are held via the amplifier 5025 and S/H circuit 5026. When the switch SWc1 is turned on at time T8, the held signal of the photodetector 5021(2,1) is converted into a digital value by the A/D converter 5027, and that value is transferred to the host computer 5002. Also, when the switch SWc1 is turned off and the switch SWc2 is turned on at time T9, the held signal of the photodetector 5021(2, 2) is converted into a digital value by the A/D converter 5027, and that value is transferred to the host computer 5002.

After all the charges accumulated on the flat-panel detector 5004 are transferred to the host computer 5002, the gate signal is set at 0 V, and the switches SWr1, SWr2, SWc1, and SWc2 are turned off at time T10.

Figure 26:
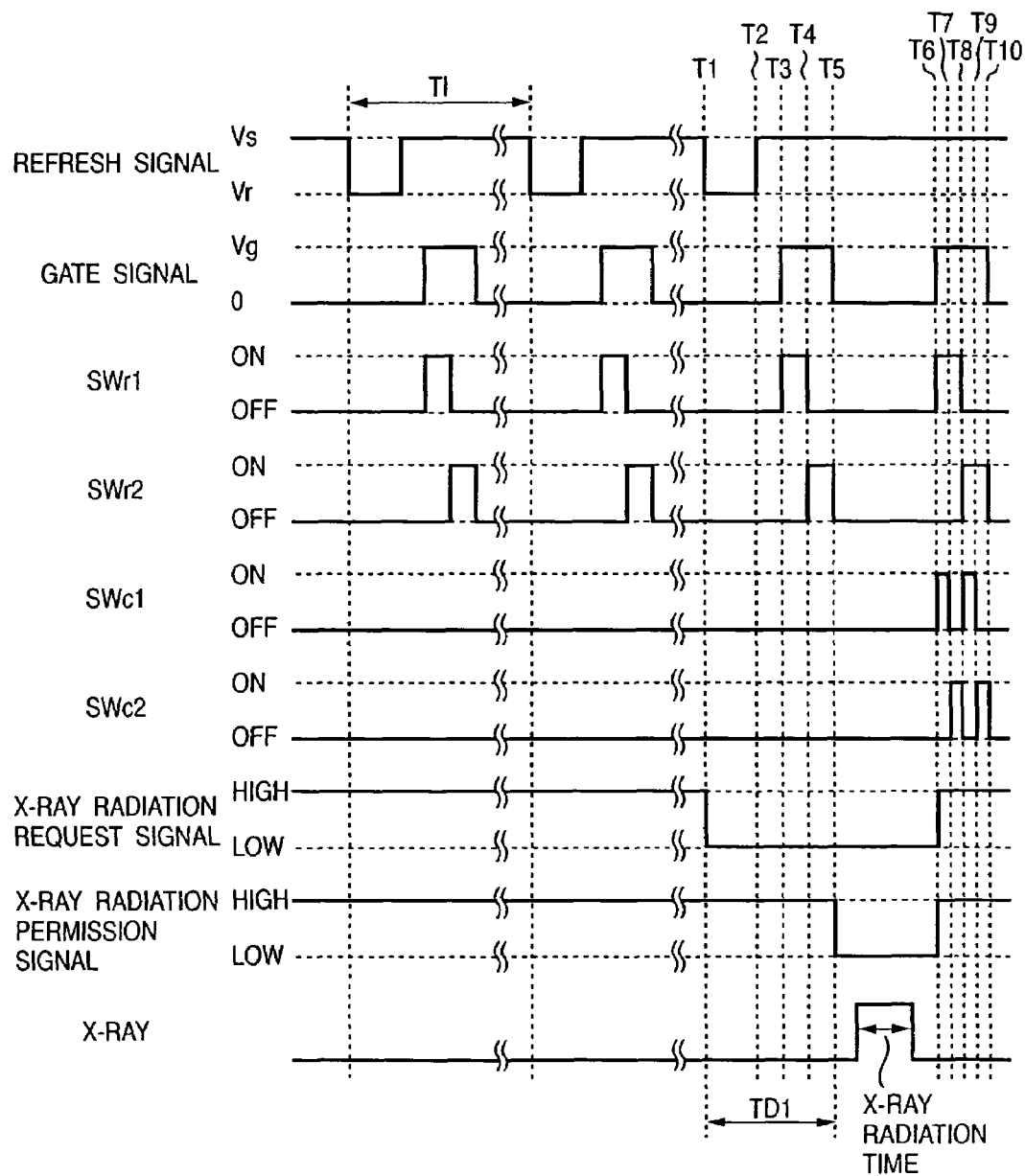
FIG. 26 is a timing chart showing the relationship between the initialization process of photoelectric conversion elements 5020 and X-ray photographing.

When an X-ray radiation request is generated at a timing other than that during the initialization process of the photoelectric conversion elements 5020, the same process as that shown in FIG. 26 which has already been explained earlier is executed. For this reason, a description of the process executed when the X-ray radiation request is generated at a timing-other than that during the initialization process of the photoelectric conversion elements 5020 will be omitted.

Figure 16:
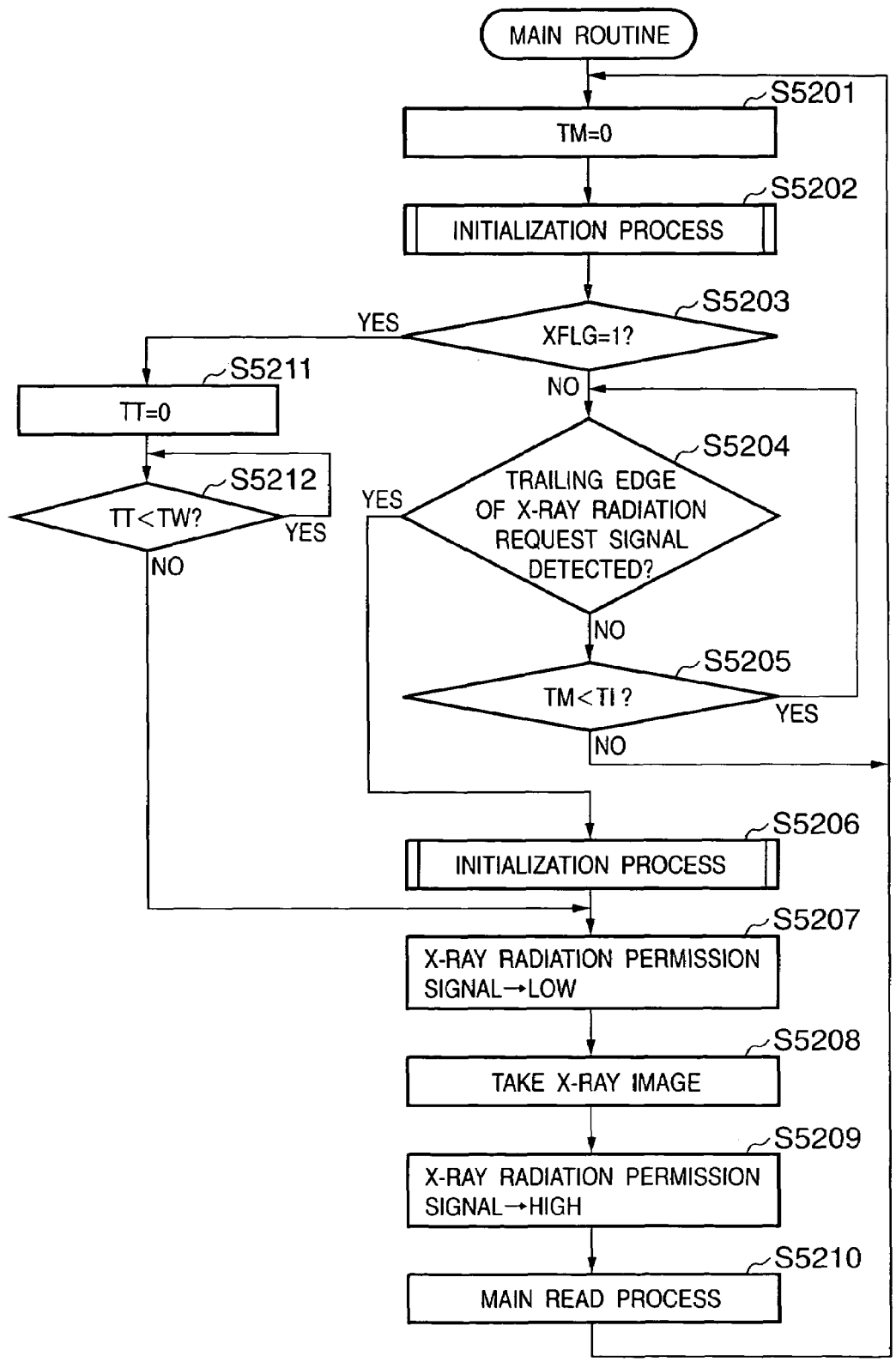
FIG. 16 is a flow chart showing the main routine of an X-ray photographing method in the second embodiment of the present invention.
Figure 17:
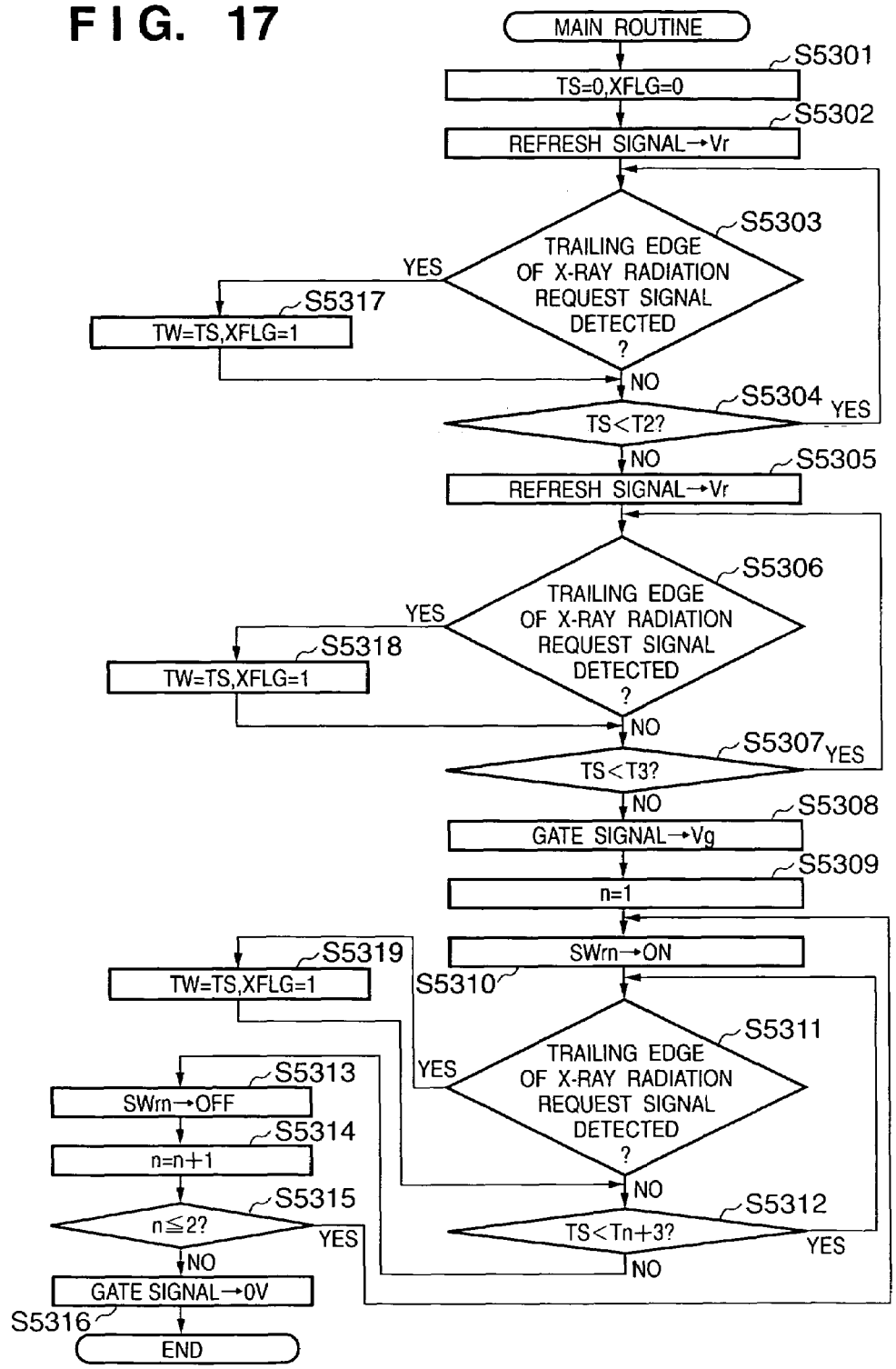
FIG. 17 is a flow chart showing the subroutine of an initialization process in an X-ray photographing method in the third embodiment of the present invention.

FIGS. 16 and 17 are flow charts of the X-ray photographing method of this embodiment. FIG. 16 shows the main routine of the X-ray photographing method, and FIG. 17 shows the subroutine of the initialization process.

Referring to FIG. 16, the value of a timer (TM) is reset to zero (step S5201). This timer is a hardware timer, which may be incorporated in the CPU 5007 or may be arranged outside the CPU. This timer automatically counts up at given time intervals (e.g., 1-ms intervals).

The initialization process of the photoelectric conversion elements 5020 is executed (step S5202). The initialization process is executed as a subroutine. The subroutine of the initialization process will be described in detail later.

It is then checked if XFLG is 1 (step S5203). XFLG is set to be 1 when the X-ray radiation request signal goes Low during the initialization process in step S5202, or remains zero when the X-ray radiation request signal does not go Low during the initialization process in step S5202. If it is determined in step S5203 that XFLG≠1, the flow advances to step S5204 to check if the trailing edge of the X-ray radiation request signal is detected (step S5204). If it is determined in step S5204 that the trailing edge of the X-ray radiation request signal is detected (the X-ray radiation signal goes Low), the flow jumps to step S5206; otherwise, the value of the timer (TM) is compared with an initialization process interval TI (step S5205). As a result of the comparison process, if TM is smaller than the initialization process interval TI, steps S5204 and S5205 are repeated. Note that TI indicates the initialization process interval shown in FIG. 15. If it is determined in step S5205 that TM≧TI, the flow returns to step S5201 to repeat the processes from steps S5201 to S5205.

If it is determined in step S5203 that XFLG=1, the value of a timer (TT) is reset to zero (step S5211). This timer is a hardware timer, which may be incorporated in the CPU 5007 or may be arranged outside the CPU. This timer automatically counts up at given time intervals (e.g., 1-ms intervals). The value of the timer (TT) is compared with that of TW (step S5212). If TT<TW, the process in step S5212 is repeated. If it is determined in step S5212 that TT≧TW, the flow advances to step S5207. Note that TW is a time period which is set in the subroutine of the initialization process in step S5202, and is required from the beginning of the initialization process until the X-ray radiation request signal goes Low.

If it is determined in step S5204 that the X-ray radiation request signal goes Low, the initialization process of the photoelectric conversion elements 5020 is immediately executed (step S5206). Upon completion of the initialization process, the X-ray radiation permission signal is changed to Low (step S5207). The X-ray generation device then radiates X-rays, and an X-ray image is taken (step S5208). After that, the X-ray radiation permission signal is changed to High (step S5209), and a main read process for reading the taken X-ray image is done (step S5210). Upon completion of the main read process, the flow returns to step S5201 to repeat the aforementioned processes. After the main read process, the taken X-ray digital image is transferred to the host computer, and is displayed on the display device after image processes and the like.

The subroutine of the initialization process in step S5202 will be described below using FIG. 17.

Initially, the values of a timer (TS) and XFLG are reset to zero (step S5301). This timer is a hardware timer, which may be incorporated in the CPU 5007 or may be arranged outside the CPU. This timer automatically counts up at given time intervals (e.g., 1-ms intervals). Also, XFLG is a flag indicating whether or not the tailing edge of the X-ray radiation request signal is detected (the X-ray radiation signal goes Low) during the initialization process.

After that, a refresh signal is set at Vr (step S5302), and it is checked if the trailing edge of the X-ray radiation request signal is detected (step S5303). If the trailing edge of the X-ray radiation request signal is not detected, the value of the timer (TS) is compared to a refresh time period T2 (step S5304). If TS<T2, steps S5303 and S5304 are repeated. In FIG. 15, assuming that time T1 is zero, T2 is a time period in which the refresh signal is set at Vr. If it is determined in step S5303 that the trailing edge of the X-ray radiation request signal is detected, the flow advances to step S5317 to save the value of the timer (TS) in a variable TW and to set XFLG to be 1. Therefore, TW indicates a time period from the beginning of the initialization process until the trailing edge of the X-ray radiation request signal is detected.

If it is determined in step S5304 that TS≧T2, the flow advances to step S5305 to set the refresh signal at Vs (step S5305).

It is then checked if the trailing edge of the X-ray radiation signal is detected (step S5306). If the trailing edge of the X-ray radiation signal is detected, the flow advances to step S5318. On the other hand, if the trailing edge of the X-ray radiation signal is not detected, the value of the timer (TS) is compared with idle read start time T3 (step S5307). If TS<T3, steps S5306 and S5307 are repeated. Note that T3 is the time at which the idle read process starts, as shown in FIG. 15. If it is determined in step S5306 that the trailing edge of the X-ray radiation signal is detected, the flow advances to step S5318 to save the value of the timer (TS) in the variable TW and to set XFLG to be 1.

If it is determined in step S5307 that TS≧T3, the gate signal is set at Vg (step S5308), and the value of a variable n is set to be 1 (step S5309). Since n=1, the switch SWr1 is turned on (step S5310), and it is detected if the trailing edge of the X-ray radiation request signal is detected (step S5311). If the trailing edge of the X-ray radiation request signal is detected, the flow advances to step S5319. On the other hand, if the trailing edge of the X-ray radiation request signal is not detected, the value of the timer (TS) is compared with time T4 since n=1 (step S5312). If TS<T4, steps S5311 and S5312 are repeated. Note that T4 is time at which SWr1 which is ON is to be turned off, as shown in FIG. 15. If it is determined in step S5311 that the trailing edge of the X-ray radiation request signal is detected, the flow advances to step S5319 to save the value of the timer (TS) in the variable TW and to set XFLG to be 1.

If it is determined in step S5312 that TS≦T4, the flow advances to step S5313 to turn off the switch SWr1 (step S5313). After that, the value of the variable n is incremented by 1 (step S5314), and it is checked if the variable n≦2 (step S5315). In this embodiment, since the photoelectric conversion elements are arranged in a 2×2 (row×column) matrix, as shown in FIG. 24, it is checked in step S5315 if the variable n≦2. However, if the elements are arranged in a 3×3 (row× column) matrix, it is checked in step S5315 if the variable n≦3.

If n≦2, the flow returns to step S5310. In this case, since n=2, the switch SWr2 is turned on, and the processes in steps S5310 to S5315 are repeated. If it is determined in step S5315 that n>2, the gate signal is set at 0V in step S5316, thus ending this subroutine.

In this way, in the subroutine of the initialization process, if the trailing edge of the X-ray radiation request signal is detected, the value of the timer (TS) is saved in TW, and XFLG is set to be 1.

Third Embodiment

Figure 18:
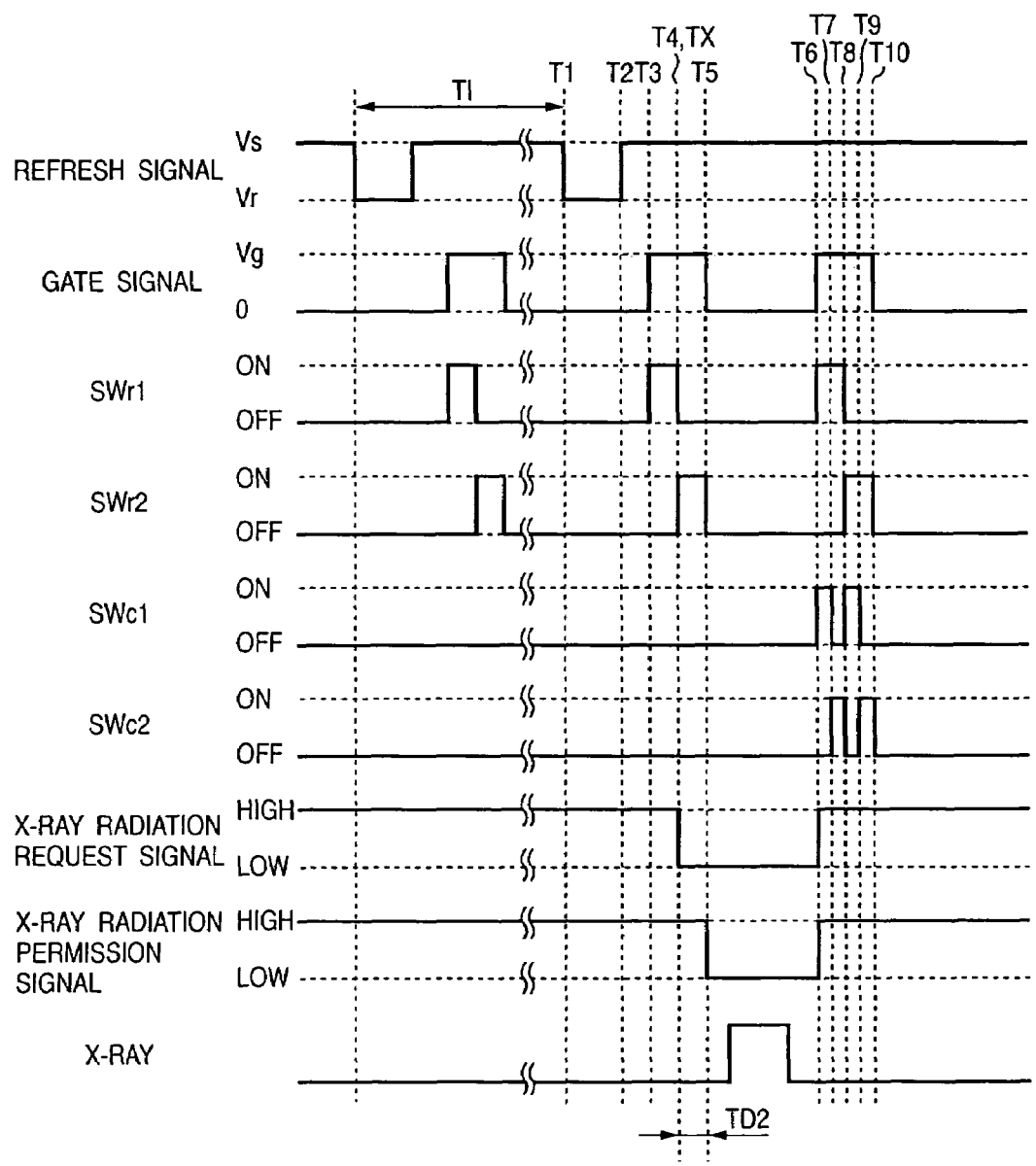
FIG. 18 is a timing chart showing the relationship between the initialization process and X-ray photographing when an X-ray radiation request is generated during the initialization process of photoelectric conversion elements 5020 in the third embodiment of the present invention.

In this embodiment, an X-ray photographing system which can shorten the exposure delay time further and its process will be explained below. FIG. 18 shows the relationship between the initialization process and X-ray photographing when an X-ray radiation request is generated during the initialization process of the photoelectric conversion elements 5020.

As shown in FIG. 18, refresh and idle read (initialization) processes are periodically repeated at intervals TI when no X-ray photographing is done.

FIG. 18 shows a case wherein the X-ray radiation switch of the X-ray generation device 5001 has been pressed at time TX during the idle read process, and an X-ray radiation request reaches the flat-panel detector controller 5005 via the host computer 5002, as in FIG. 15. Upon generation of the X-ray radiation request, the host computer 5002 that received this X-ray radiation request changes an X-ray radiation request signal to Low.

When the idle read process is completed by setting a gate signal at 0 V at time T5, the flat-panel detector controller 5005 immediately changes an X-ray radiation permission signal to Low.

As a result, since the flat-panel detector controller 5005 changes the X-ray radiation permission signal to Low immediately after the initialization process, a time period (exposure delay time) TD2 from when the X-ray radiation request signal goes Low until the X-ray radiation permission signal changes to Low can be shorter than that in, e.g., the method described in the second embodiment.

When the X-ray radiation permission signal goes Low, this signal reaches the X-ray generation device 5001 via the host computer 5002, and the X-ray generation device 5001 radiates X-rays, as shown in FIG. 18. The radiated X-rays are transmitted through the object 5006 and are converted by the phosphor 5003 into light proportional to the incoming X-ray dose, and charges corresponding to that light are accumulated on the capacitors 5021C.

Upon completion of X-ray radiation, the flat-panel detector controller 5005 changes the X-ray radiation permission signal to High at time T6. When X-ray radiation permission signal goes High, this signal reaches the X-ray generation device 5001 via the host computer 5002. The X-ray generation device 5001 changes the X-ray radiation request signal to High.

Also, upon completion of X-ray radiation, a gate signal is set to be Vg and the switch SWr1 is turned on at time T6. Then, the voltages at the gate electrodes G of the TFTs 5022 (1,1) and 5022(1,2) of the first row shown in FIG. 24 change to Vg, and the charges accumulated on the capacitors 5021C in the photodetectors 5021 of the first row are read. The read charges are held by the S/H circuit 5026 via the amplifier 5025. When the switch SWc1 is turned on at time T6, the held signal of the photodetector 5021(1,1) is converted into a digital value by the A/D converter 5027, and that value is transferred to the host computer. Also, when the switch SWc1 is turned off and the switch SWc2 is turned on at time T7, the held signal of the photodetector 5021(1,2) is converted into a digital value by the A/D converter 5027, and that value is transferred to the host computer 5002.

When the switch SWr1 is turned off and the switch SWr2 is turned on at time T8, the voltages at the gate electrodes G of the TFTs 5022(1,1) and 5022(2,2) of the second row shown in FIG. 24 change to Vg, and the charges accumulated on the capacitors 5021C in the photodetectors 5021 of the second row are read. The read signals are held via the amplifier 5025 and S/H circuit 5026. When the switch SWc1 is turned on at time T8, the held signal of the photodetector 5021(2,1) is converted into a digital value by the A/D converter 5027, and that value is transferred to the host computer 5002. Also, when the switch SWc1 is turned off and the switch SWc2 is turned on at time T9, the held signal of the photodetector 5021(2,2) is converted into a digital value by the A/D converter 5027, and that value is transferred to the host computer 5002.

After all the charges accumulated on the flat-panel detector 5004 are transferred to the host computer 5002, the gate signal is set at 0 V, and the switches SWr1, SWr2, SWc1, and SWc2 are turned off at time T10.

When an X-ray radiation request is generated at a timing other than that during the initialization process of the photoelectric conversion elements 5020, the same process as that shown in FIG. 26 which has already been explained earlier is executed. For this reason, a description of the process executed when the X-ray radiation request is generated at a timing other than that during the initialization process of the photoelectric conversion elements 5020 will be omitted.

Therefore, according to this embodiment, the exposure delay time when the X-ray radiation request is generated at a timing other than that in the initialization process is TD1 and that when the X-ray radiation request is generated during the initialization process is TD2. Since TD2≦TD1, the exposure delay time is TD1 at a maximum. As a result, when the X-ray radiation request is generated during the initialization process, the exposure delay time can be shorter than that in the second embodiment.

Figure 19:
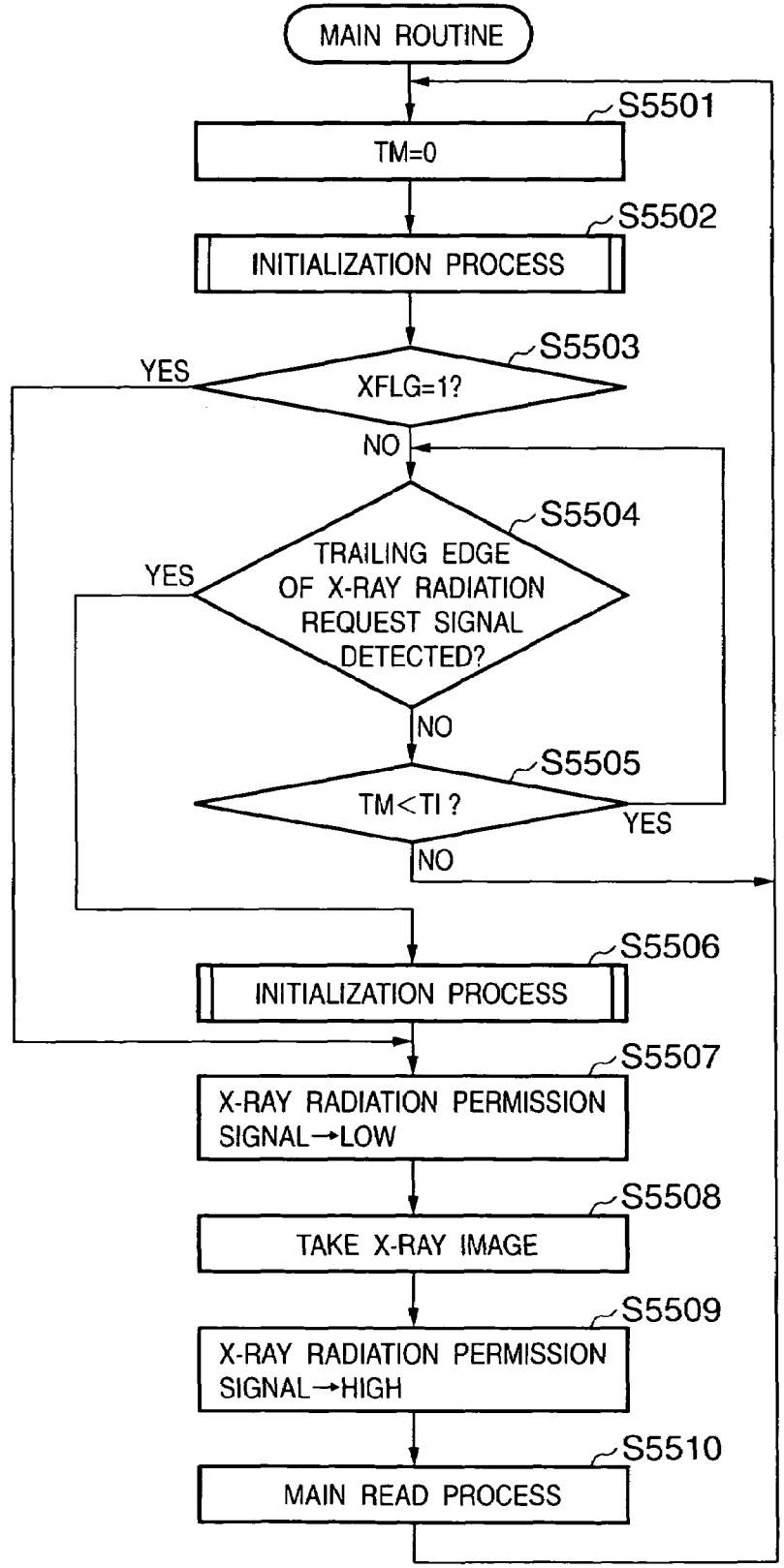
FIG. 19 is a flow chart showing the main routine of an X-ray photographing method in the third embodiment of the present invention.
Figure 20:
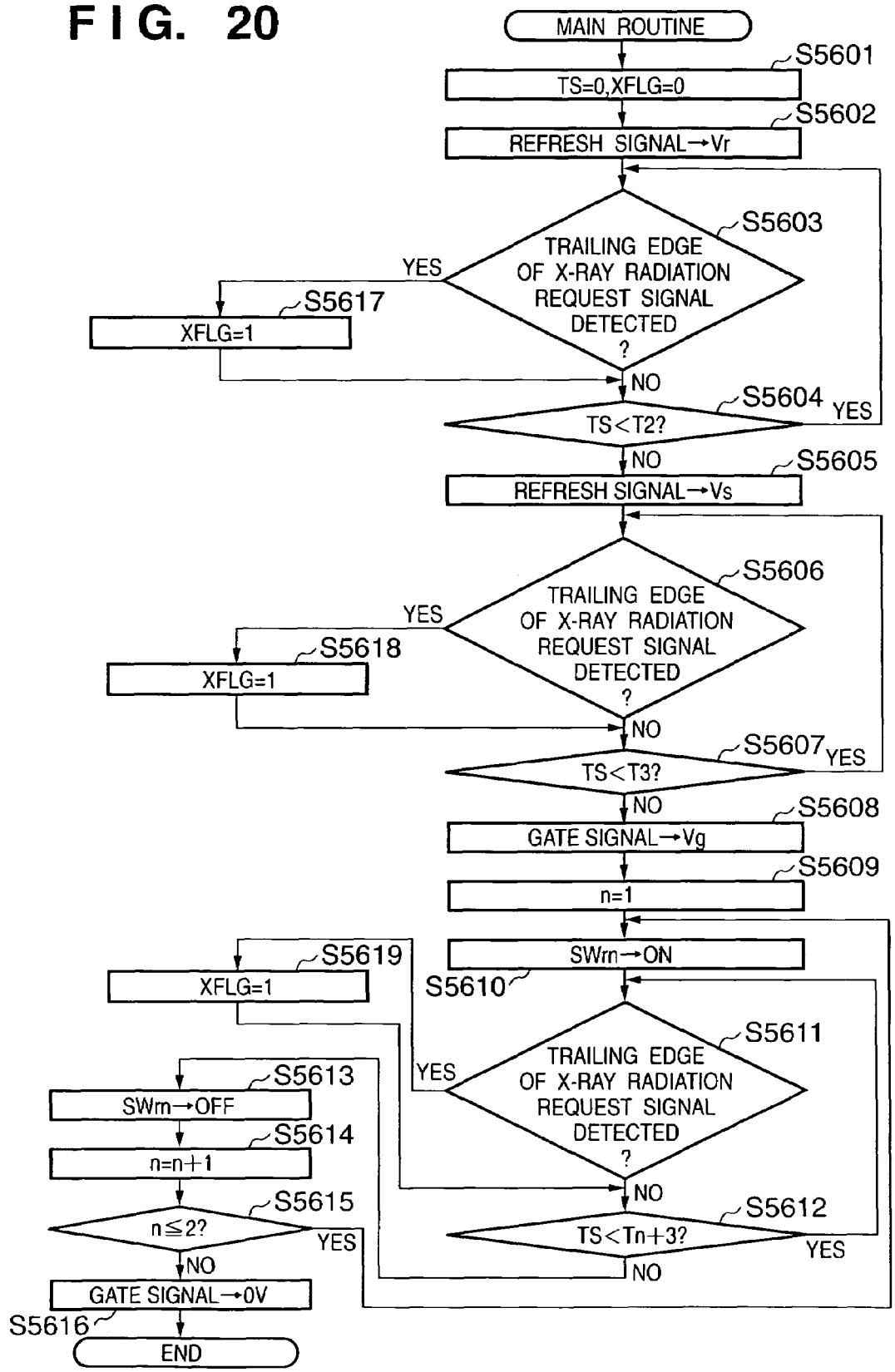
FIG. 20 is a flow chart showing the subroutine of an initialization process in the X-ray photographing method in the third embodiment of the present invention.

FIGS. 19 and 20 are flow charts of the X-ray photographing method of this embodiment. FIG. 19 shows the main routine of the X-ray photographing method, and FIG. 20 shows the subroutine of the initialization process.

Referring to FIG. 19, the value of a timer (TM) is reset to zero (step S5501). This timer is a hardware timer, which may be incorporated in the CPU 5007 or may be arranged outside the CPU. This timer automatically counts up at given time intervals (e.g., 1-ms intervals).

The initialization process of the photoelectric conversion elements 5020 is executed (step S5502). The initialization process is executed as a subroutine. The subroutine of the initialization process will be described in detail later.

It is then checked if XFLG is 1 (step S5503). XFLG is set to be 1 when the X-ray radiation request signal goes Low during the initialization process in step S5502, or remains zero when the X-ray radiation request signal does not go Low during the initialization process in step S5502. If it is determined in step S5503 that XFLG≠1, the flow advances to step S5504 to check if the trailing edge of the X-ray radiation request signal is detected (step S5504). If it is determined in step S5504 that the trailing edge of the X-ray radiation request signal is detected, the flow jumps to step S5506. On the other hand, if the trailing edge of the X-ray radiation request signal is not detected, the value of the timer (TM) is compared with an initialization process interval TI (step S5505). If TM is smaller than the initialization process interval TI, steps S5504 and S5505 are repeated. Note that TI indicates the initialization process interval shown in FIG. 18. If it is determined in step S5505 that TM≧TI, the flow returns to step S5501 to repeat the processes from steps S5501 to S5505.

If it is determined in step S5503 that XFLG=1, the flow jumps to step S5507 to change an X-ray radiation permission signal to Low (step S5507). Therefore, if the X-ray radiation request signal goes Low during the initialization process in step S5502, the initialization process in step S5506 is skipped.

If it is determined in step S5504 that the X-ray radiation request signal goes Low, the flow jumps to step S5506 to immediately execute the initialization process of the photoelectric conversion elements 5020 (step S5506). Upon completion of the initialization process, the X-ray radiation permission signal is changed to Low (step S5507). The X-ray generation device then radiates X-rays, and an X-ray image is taken (step S5508). After that, the X-ray radiation permission signal is changed to High (step S5509), and a main read process for reading the taken X-ray image is done (step S5510). Upon completion of the main read process, the flow returns to step S5501 to repeat the aforementioned processes. After the main read process, the taken X-ray digital image is transferred to the host computer 5002, and is displayed on the display device after image processes and the like.

The initialization routine in step S5502 will be described with reference to FIG. 20.

Initially, the values of a timer (TS) and XFLG are reset to zero (step S5601). This timer is a hardware timer, which may be incorporated in the CPU 5007 or may be arranged outside the CPU. This timer automatically counts up at given time intervals (e.g., 1-ms intervals). Also, XFLG is a flag indicating whether or not the tailing edge of the X-ray radiation request signal is detected (the X-ray radiation signal goes Low) during the initialization process.

After that, a refresh signal is set at Vr (step S5602), and it is checked if the trailing edge of the X-ray radiation request signal is detected (step S5603). If the trailing edge of the X-ray radiation request signal is not detected, the value of the timer (TS) is compared to a refresh time period T2 (step S5604). If TS<T2, steps S5603 and S5604 are repeated. In FIG. 15, assuming that time T1 is zero, T2 is a time period in which the refresh signal is set at Vr. If it is determined in step S5603 that the trailing edge of the X-ray radiation request signal is detected, the flow advances to step S5617 to set XFLG to be 1. If it is determined in step S5604 that TS≧T2, the flow advances to step S5605 to set the refresh signal at Vs (step S5605).

It is then checked if the trailing edge of the X-ray radiation signal is detected (step S5606). If the trailing edge of the X-ray radiation signal is detected, the flow advances to step S5618. On the other hand, if the trailing edge of the X-ray radiation signal is not detected, the value of the timer (TS) is compared with idle read start time T3 (step S5607). If TS<T3, steps S5606 and S5607 are repeated. Note that T3 is the time at which the idle read process starts, as shown in FIG. 18. If it is determined in step S5606 that the trailing edge of the X-ray radiation signal is detected, the flow advances to step S5618 to set XFLG to be 1.

If it is determined in step S5607 that TS≧T3, the gate signal is set at Vg (step S5608), and the value of a variable n is set to be 1 (step S5609). Since n=1, the switch SWr1 is turned on (step S5610), and it is detected if the trailing edge of the X-ray radiation request signal is detected (step S5611). If the trailing edge of the X-ray radiation request signal is detected, the flow advances to step S5619. On the other hand, if the trailing edge of the X-ray radiation request signal is not detected, the value of the timer (TS) is compared with time T4 since n=1 (step S5612). If TS<T4, steps S5611 and S5612 are repeated. Note that T4 is the time at which SWr1 which is ON is to be turned off, as shown in FIG. 18. If it is determined in step S5611 that the trailing edge of the X-ray radiation request signal is detected, the flow advances to step S5619 to set XFLG to be 1.

If it is determined in step S5612 that TS≧T4, the flow advances to step S5613 to turn off the switch SWr1 (step S5613). After that, the value of the variable n is incremented by 1 (step S5614), and it is checked if the variable n≦2 (step S5615). In this embodiment, since the photoelectric conversion elements are arranged in a 2×2 (row×column) matrix, as shown in FIG. 24, it is checked in step S5615 if the variable n≦2. However, if the elements are arranged in a 3×3 (row× column) matrix, it is checked in step S5615 if the variable n≦3.

If n≦2, the flow returns to step S5610. In this case, since n=2, the switch SWr2 is turned on, and the processes in steps S5610 to S5615 are repeated. If it is determined in step S5615 that n>2, the gate signal is set at 0V in step S5616, thus ending this subroutine.

In this manner, in the subroutine of the initialization process, XFLG is set to be 1 when the trailing edge of the X-ray radiation request signal is detected.

In this embodiment, the initialization process includes one refresh process and one idle read process. However, the present invention is not limited to such specific process, and the initialization process may include one refresh process and a plurality of idle read processes.

In the flat-panel detector 5004, the photoelectric conversion elements are two-dimensionally arranged in a 2×2 (row× column) matrix. However, the present invention is not limited to such specific arrangement. In practice, photoelectric conversion elements are normally arranged in a 1000 to 4000× 1000 to 4000 (row×column) matrix. The present invention is not limited to this, either, and the number of photoelectric conversion elements in one direction can be smaller or larger than the above value.

In this embodiment, the row address select circuit 5009 comprises the gate control circuit 5024 and switches SWr1 and SWr2. However, the present invention is not limited to such specific arrangement, and any other arrangements may be used as long as the photoelectric conversion elements 5020 in the row direction can be selected.

In this embodiment, the column address select circuit 5010 comprises the amplifiers 5025, S/H circuits 5026, and switches SWc1 and SWc2. However, the present invention is not limited to such specific arrangement, and any other arrangements may be used as long as the photoelectric conversion elements 5020 in the column direction can be selected.

Another Embodiment

The present invention is not limited to the apparatus and method alone for implementing the aforementioned embodiments, but the scope of the present invention includes a case wherein the above embodiments are achieved by supplying a program code of software that can implement the functions of the above-mentioned embodiments to a computer (or a CPU or MPU) in a system or apparatus, and making the computer control various devices in the system or apparatus.

In this case, the program code itself read out from the storage medium implements the functions of the above-mentioned embodiments, and the program code itself, and means for supplying the program code to the computer (i.e., a storage medium which stores the program code) are included in the scope of the present invention.

As the storage medium for storing such program code, for example, a floppy disk, hard disk, optical disk, magnetooptical disk, CD-ROM, magnetic tape, nonvolatile memory card, ROM, and the like may be used.

The program code is included in the scope of the embodiments not only when the functions of the above embodiments are implemented by controlling various devices according to the supplied program code alone but also when the functions of the embodiments are implemented by collaboration of the program code and an OS (operating system) or another application software running on the computer.

Furthermore, the scope of the present invention includes a case wherein the functions of the above-mentioned embodiments are implemented by some or all of actual processing operations executed by a CPU or the like arranged in a function extension board or a function extension unit, which is inserted in or connected to the computer, after the supplied program code is written in a memory of the extension board or unit.

As described above, according to the present invention, even when an X-ray radiation request is received during initialization of the detector, noise in a taken X-ray image can be suppressed. Also, when the X-ray radiation request is received during initialization of the detector, the exposure delay time can be shortened.

As many apparently widely different embodiments of the present invention can be made without departing from the spirit and scope thereof, it is to be understood that the invention is not limited to the specific embodiments thereof except as defined in the appended claims.

What is claimed is:

1. A radiography system, comprising:
   a detector for detecting x-ray radiation generated by an x-ray radiation generation device,
   a detector controller for initializing said detector at a predetermined timing, controlling said detector, and taking an x-ray radiation image on the basis of the x-ray radiation detected by said detector,
   wherein said detector controller comprises,
   storage means for acquiring and storing a time period from when initialization of said detector starts until an x-ray radiation irradiation request signal is received; and
   instruction means for, when the x-ray radiation irradiation request signal is received during an initialization process of said detector, instructing to execute a wait process for the stored time period after the initialization process, and
   upon completion of the wait process by said instruction means, a radiography permission signal is sent to the x-ray radiation generation device.

2. A method of controlling a radiography system, comprising the steps of:
   detecting x-ray radiation generated by a radiation generation device,
   initializing a detector at a predetermined timing,
   controlling said detector,
   taking an x-ray radiation image on the basis of the x-ray radiation detected by said detector,
   acquiring a time period from when initialization of said detector starts until an x-ray radiation irradiation request signal is received;
   storing said time period;
   receiving the x-ray radiation irradiation request signal during an initialization process of said detector;
   executing a wait process for the stored time period after the initialization process according to control instructions; and
   sending a radiography permission signal to said x-ray radiation generation device upon completion of the wait process based on the control instructions.

3. A computer-readable medium which stores a program code for making an information processing apparatus execute a method of controlling a radiography system cited in claim 2 when said program code is loaded by said information processing apparatus.

* * * * *